(12) United States Patent
Simpson et al.

(10) Patent No.: US 6,857,840 B2
(45) Date of Patent: Feb. 22, 2005

(54) REMOVABLE LOAD BED FOR A VEHICLE

(75) Inventors: Patrick Dana Simpson, Penticton (CA); Terry Edward Simpson, Penticton (CA); Dana William Simpson, Penticton (CA)

(73) Assignee: Simpson Tranzformer, Penticton (CA)

( * ) Notice: Subject to any disclaimer, the term of this patent is extended or adjusted under 35 U.S.C. 154(b) by 0 days.

(21) Appl. No.: 09/493,478

(22) Filed: Jan. 28, 2000

(65) Prior Publication Data

US 2003/0129046 A1 Jul. 10, 2003

(51) Int. Cl.$^7$ ................................................ B60P 1/28
(52) U.S. Cl. ...................... 414/491; 414/498; 254/372
(58) Field of Search ................ 414/491, 494, 414/498–500, 527, 538, 559, 571, 507, 487; 296/156, 164, 167; 254/242, 279, 311, 371, 372, 391, 45

(56) References Cited

U.S. PATENT DOCUMENTS

| | | | |
|---|---|---|---|
| 1,794,318 A | | 2/1931 | Perkins et al. |
| 2,287,551 A | * | 6/1942 | Coffing ........................ 254/369 |
| 2,669,366 A | * | 2/1954 | Sievers ........................ 414/527 |
| 2,811,269 A | | 10/1957 | Anderson et al. |
| 3,034,674 A | | 5/1962 | Bertoglio et al. |
| 3,221,913 A | | 12/1965 | Chamberlain |
| 3,684,112 A | | 8/1972 | Wijers |
| 3,768,678 A | | 10/1973 | Youngers |
| 3,777,856 A | * | 12/1973 | Gardner et al. ........ 254/391 XV |
| 4,872,632 A | * | 10/1989 | Johnson ............... 254/391 XV |
| 5,203,668 A | | 4/1993 | Marmur |
| 5,269,642 A | | 12/1993 | Zoromski |
| 5,848,869 A | | 12/1998 | Slocum et al. |

FOREIGN PATENT DOCUMENTS

| | | | | |
|---|---|---|---|---|
| DE | 7415985 | | 5/1974 | |
| EP | 075307 A1 | * | 3/1983 | |
| FR | 2 686 843 | | 1/1992 | |
| JP | 54-311 | * | 1/1979 | .................. 414/500 |
| WO | WO 86/07019 | * | 12/1986 | .................. 414/494 |

OTHER PUBLICATIONS

International Search Report, PCT, CA01/00078, Jun. 14, 2001.

* cited by examiner

*Primary Examiner*—James W. Keenan
(74) *Attorney, Agent, or Firm*—Kolisch Hartwell, P.C.

(57) ABSTRACT

A loading apparatus for a vehicle, the apparatus having a first frame; a second frame having a chain mounted thereupon; and a locking system that is mounted on the first frame. The locking system has a drive wheel, a first arm member and a second arm member. The system is configured such that in a generally closed position, the chain engages the drive wheel in a first position, the drive wheel is connected to the arms; the arms are urged into the closed position. In a generally open position, the chain engages the drive wheel in a second position and the arms are urged into the open position by the second frame.

18 Claims, 21 Drawing Sheets

REMOVABLE LOAD BED FOR A VEHICLE

BACKGROUND OF THE INVENTION

1. Field of the Invention

The present invention relates to devices for loading and unloading containers and more particularly, to a chain loading mechanism for safely loading a movable frame onto a stationary vehicle.

2. Description of Related Art

A conventional cab and chassis vehicle when used to transport loads usually comprises a frame and a device for pulling a movable frame from the ground up and over onto the vehicles' stationary frame, and guiding the frame into the loaded position. During normal usage, the movable frame supports a load which is transferred from the ground to the vehicle chassis via an arrangement of elevating booms and guide systems that are controlled by an operator. This simple approach has many limitations and there are many patents disclosing devices that simplify the procedure and/or improve the safety aspects of such a maneuver.

U.S. Pat. No. 1,794,318 (Perkins et al.) discloses a dumping body frame truck that is driven by a chain drive. The body is formed by telescopic sections that are collapsed to dump a load. While the sections are designed to slide along the chassis body, there is no bed that is removable from the chassis.

U.S. Pat. No. 2,811,269 (Anderson) discloses a removable bed that relies on a winch assembly to draw the truck body onto the chassis.

U.S. Pat. No. 5,203,788 (Marmur) discloses an apparatus for loading a container onto a truck body or trailer. This arrangement discloses the use of a pivoting arm and a cable to move the trailer.

U.S. Pat. No. 5,269,746 (Zoromski) discloses a container loading and unloading system that is particularly suited for loading campers and cargo boxes onto a truck bed. The system appears to be independent of the vehicle except for a yoke and pivot bar structure that is attached to the rear bumper.

U.S. Pat. No. 5,856,869 (Slokum et al.) discloses a removable load bed that includes a tiltable bed that is operated by a piston to control loading and unloading of the container. The system relies on a cable and bracket system to move the container. While the tiltable bed and interlocking bracket and cavity aspect of this patent appear to address deficiencies that are present in the previously described patents, it still suffers from the potential that the cable may come off the bracket, and therefore, could potentially be a safety hazard.

The frames of common conventional loading devices are generally similar in size and construction, and thus many of the loads that are to be used with such a frame arrangement tend to rely on a smooth and easy transfer from the ground to the truck bed. It is often difficult to maintain adequate control of this maneuver, and thus inadvertent lateral movement and slippage of the pulling mechanism can occur, especially during the initial lifting procedure.

Thus, there is a need for a removable load bed assembly for use with a conventional cab and chassis vehicle that provides a safe method of transferring a load from the ground onto the chassis of the vehicle. This patent should not be limited to this only. Other examples are military track and rubber tired vehicles that could have the bodies changed from a gun carrier to personal carrier to an ambulance body. This system will lift any load from one level to another.

SUMMARY OF THE INVENTION

The invention reduces the difficulties and disadvantages of the prior art by providing a guide system, a simple chain locking assembly and a device to control tilting action which can be retrofitted to most conventional truck chassis at relatively low cost. The device provides a secure and simple means for loading a load onto a truck, thus reducing relative movement therebetween.

The invention provides a loading apparatus for a vehicle, the apparatus comprising:
  a first frame;
  a second frame having a chain mounted thereupon; and
  a locking system mounted on the first frame the system having a drive wheel, a first arm member and a second arm member, the system being configured such that:
  in a generally closed position, the chain engages the drive wheel in a first position, the drive wheel being connected to the arms; the arms being urged into the closed position; and in a generally open position, the chain engages the drive wheel in a second position, the arms being urged into the open position by the second frame.

In another aspect, the invention provides:
  a third arm member;
  a stationary support member fixably mounted on the drive wheel, the support member having a first end portion and a second end portion; and
  a compressing member mounted on the support, the compressing member being attached to the arms, the arms being urged towards each other in the closed position wherein the first arm member and the second arm member interlock with each other in the closed position.

In another aspect the invention provides the first arm member having a projection extending outwardly therefrom, the arm member having a first end portion and a second end portion, the first end portion being urged towards the chain, the second end portion being pivotally attached to the first end portion of the support; the second arm member having a first end portion and a second end portion, the first end portion being urged towards the chain, the second end portion being pivotally attached to the second end portion of the support member; and the third arm member having a first end portion and a second end portion, the first end portion, the second end portion being pivotally attached to the second end portion of the support member. The third arm member has a groove disposed therein, the groove being shaped to cooperate with the projection on the first arm member.

In yet another aspect, the invention provides the first frame further comprising: a front end portion and a rear end portion, the frame being mounted on a vehicle chassis, a prime mover mounted on the chassis; and an axle connected to the drive wheel to alternatively move the drive wheel in a first and a second direction.

In another aspect the invention provides a loading frame comprising: the first frame as claimed as described above; an actuator; and an elevatable support to receive a load from the second frame and connected to the actuator. The loading frame further including: a guide system having a central rail shaped to cooperate with the second frame. The rail has a slidably resilient material fixably mounted thereupon.

In another aspect, the invention provides the second frame further having; a plurality of wheels such that the second frame is movable relative to the first frame; a first rail, a second rail and a central rail, the central rail being shaped so as to cooperate with the central rail on the first frame.

In yet another aspect, the invention provides the second frame having a front end portion and a rear end portion, the front end portion being disposed towards the rear end portion of first frame.

BRIEF DESCRIPTION OF THE DRAWINGS

In drawings which illustrate embodiment of the invention.

DETAILED DESCRIPTION

Figure 1:
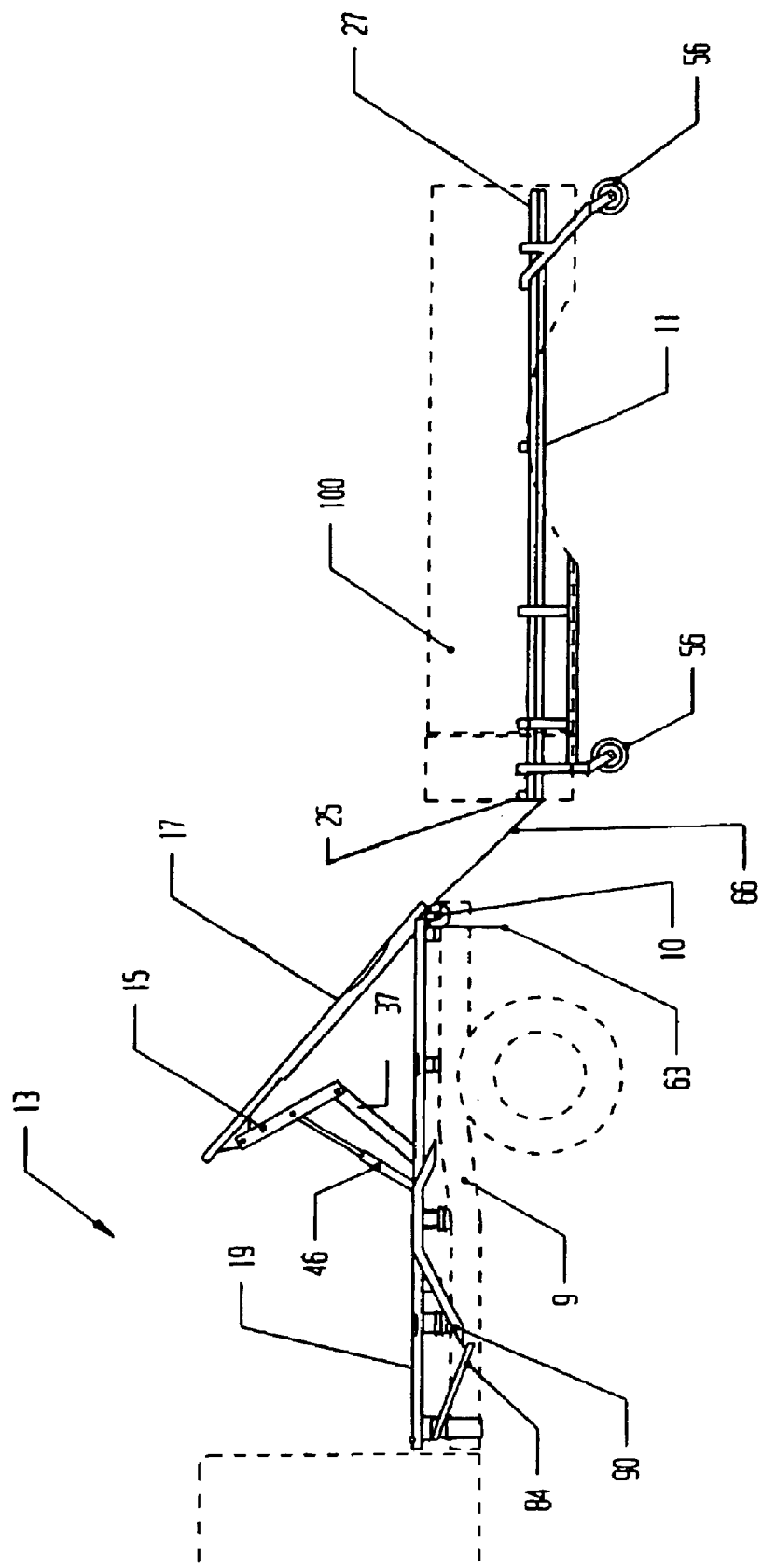
FIG. 1 is a side view of a first embodiment of the invention showing a movable frame engaging a stationary frame on a vehicle via a chain.
Figure 2:
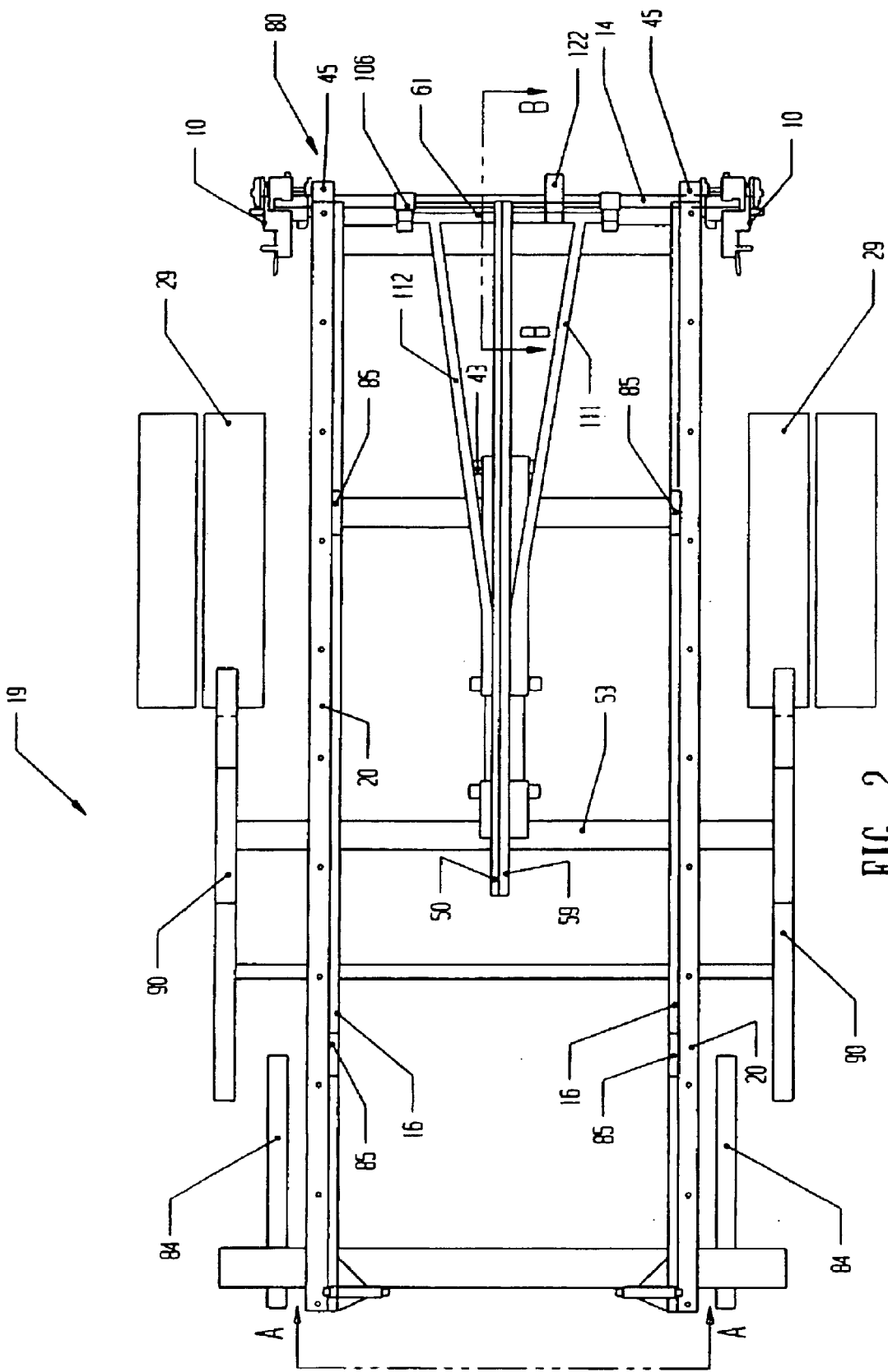
FIG. 2 is a top view of the vehicle showing the stationary frame attached to the vehicle.

Referring to FIGS. 1 and 2, an apparatus according to a first embodiment of the invention is shown generally at 10 and connects a movable frame 11 to a conventional cab and chassis vehicle 13 via a chain 66, the frame 11 having a load 100 securely mounted thereupon. The vehicle 13 has a chassis 9 and a stationary frame 19 securely mounted thereupon. The stationary frame 19 is a "skeleton body" and is secured to the chassis 9 by conventional means, and is arranged such that a front end of the frame is disposed towards the rear of the cab of the vehicle 13 and a rear end portion is disposed towards a rear end portion of the chassis 9.

The stationary frame 19 has a guide system mounted on the chassis 9 of the vehicle 13 and comprises a "skeleton-type" arrangement of rails 16. The rails 16 are positioned parallel to each other along the side of the chassis 9 and are shaped so as to allow efficient sliding and seating of the moveable frame 11 during loading and are coated with an ultra-high molecular weight (UHMW) polymer 20. One skilled in the art will understand that polymers of this type act as a lubricant to assist the moveable frame 11 as it slides over the stationary frame 19, as will be described below. It will be understood that there are many different types of polymeric coatings used in this type of operation.

Referring to FIGS. 1, 2, 3, 12 and 18 an elevatable support 17 is centrally and rotatably attached to an axle 14 and includes a "skeleton framework" 61 having a separate guide system 59 consisting of a forwardly disposed end and a rearwardly disposed end. The guide system 59 consists of a C-shaped channel 54 with an internal ramp 33, and a slide rail 44. The slide rail 44 is covered with UHMW 50 on upper and lower faces. The skeleton framework 61 has two ends and a center that is parallel to the axle 14. The skeleton framework 61 ends are rotatably attached to the axle 14 by a pair of bushings 106. The position of skeleton framework 61 on the axle 14 is maintained by a pair of cylindrical spacers 107. Each spacer 107 is positioned on the axle 14 between the elevatable support bushings 106 and a pair of outer axle bearings 108. Those skilled in the art will recognize that bearings of different types may be used in place of the bushings 106 and spacers 107. The axle 14 is rotatably mounted to the chassis 9 by the bearings 108 and a bearing 122. Each bearing 108 is fixably attached to and located on the axle 14 adjacent the two end portions 21 and 55. The bearings 108 are fixably attached to each of the chassis 9 frame rails. The bearing 122 is fixably attached and located in the center of the axle 14 and is supported by the stationary frame 19. The axle 14 is driven by an electric motor 94. Those skilled in the art will recognize that other types of motors may be used to implement aspects of the invention. The axle 14 has two end portions 21 and 55 that covers the first embodiment 10. The motor 94 is attached to the axle 14 by a keyed sprocket and an endless roller chain 104. The turning motion of the axle 14 is transferred to a pair of keyed sprockets 12 that are mounted on the ends of the axle 14.

The guide system 59 is aligned parallel to and between the frame rails 16, and is fixably attached to the framework 61 such that a movable frame receiver 72 aligns and interlocks with the slide rail 44 when the frame 11 is mounted on stationary frame 19, as will be described. The bottom edge of the rearwardly disposed section of the guide system 59 is fixably attached to the top edge of the center portion of the skeleton framework 61. A pair of support frame members, 111 and 112, are attached to the guide system 59, and each having first and second ends. The first end top edges of the support members, 111 and 112, are fixably attached to the bottom edge of the forwardly disposed end of guide system 59, whereas the second ends are fixably attached to the corresponding ends of the skeleton framework 61. The support members, 111 and 112, support the forwardly disposed end of guide system 59, thereby ensuring the guide system 59 remains parallel with the frame rails 58 on the moveable frame 11. The top and bottom surfaces of the rail 44 are covered with UHMW 50.

As best seen in FIGS. 1, 2, 3 and 19, a hydraulic cylinder 46 is attached to the stationary frame 19 and is moved by a pair of arms, 15 and 37, that are pivotally attached to the frame 19, a cross member 53 and the forwardly disposed end of the guide system 59. The hydraulic cylinder 46 acts as a shock absorber during on-loading and off-loading and also allows an operator to stop the tilting motion of the moveable frame 11 at any time thereby giving the system a greater degree of control during operation. It will be understood that other "damping" systems may be used with the elevatable support 17.

Also, those skilled in the art will recognize that the elevatable support 17 does not require arms 15 and 37 for the hydraulic cylinder 46. Another possible method would be to use a longer cylinder thereby avoiding the use of the arms, 15 and 37.

Figure 19:
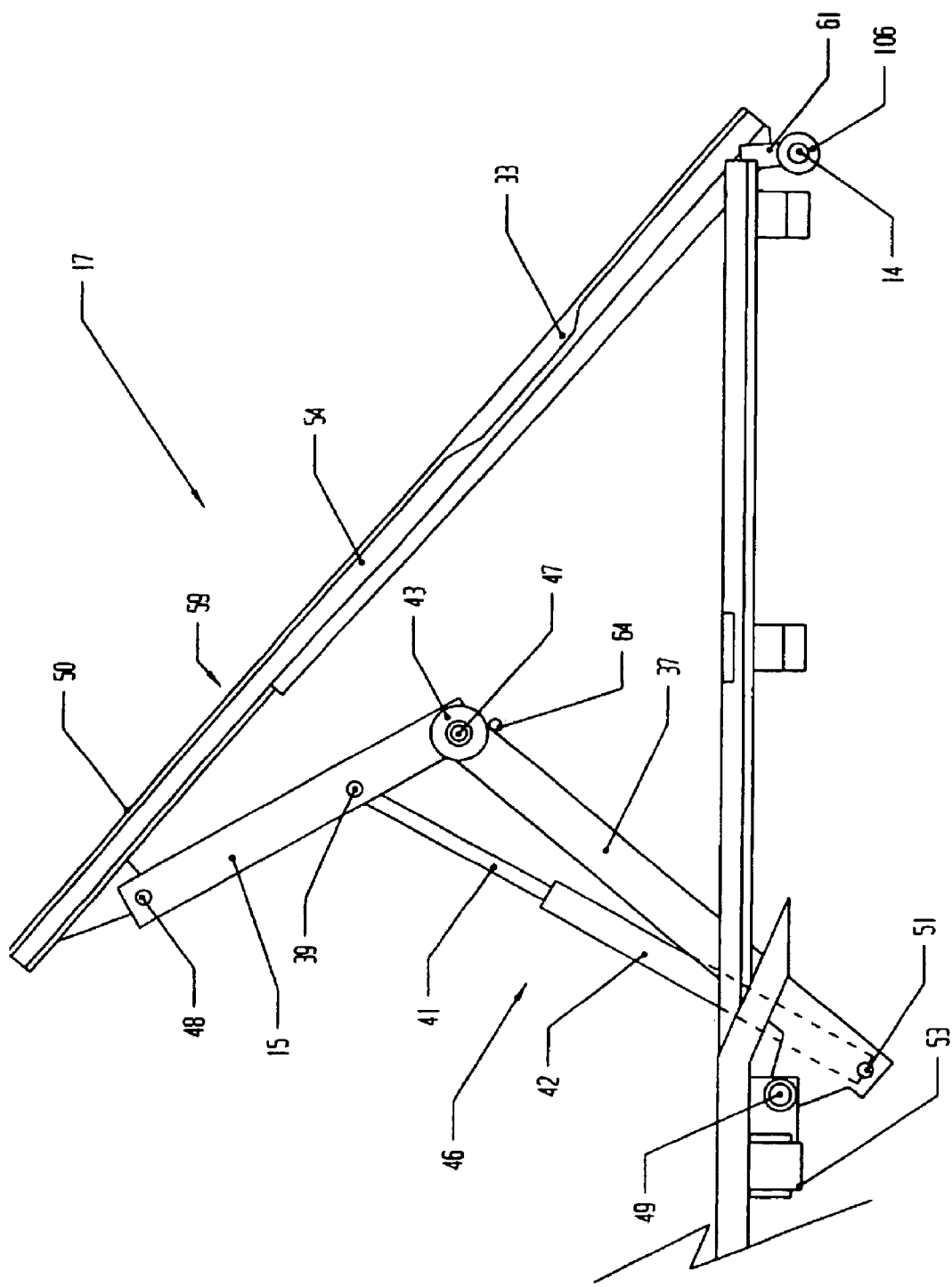
FIG. 19 is a detailed view of the elevatable support.
Figure 20:
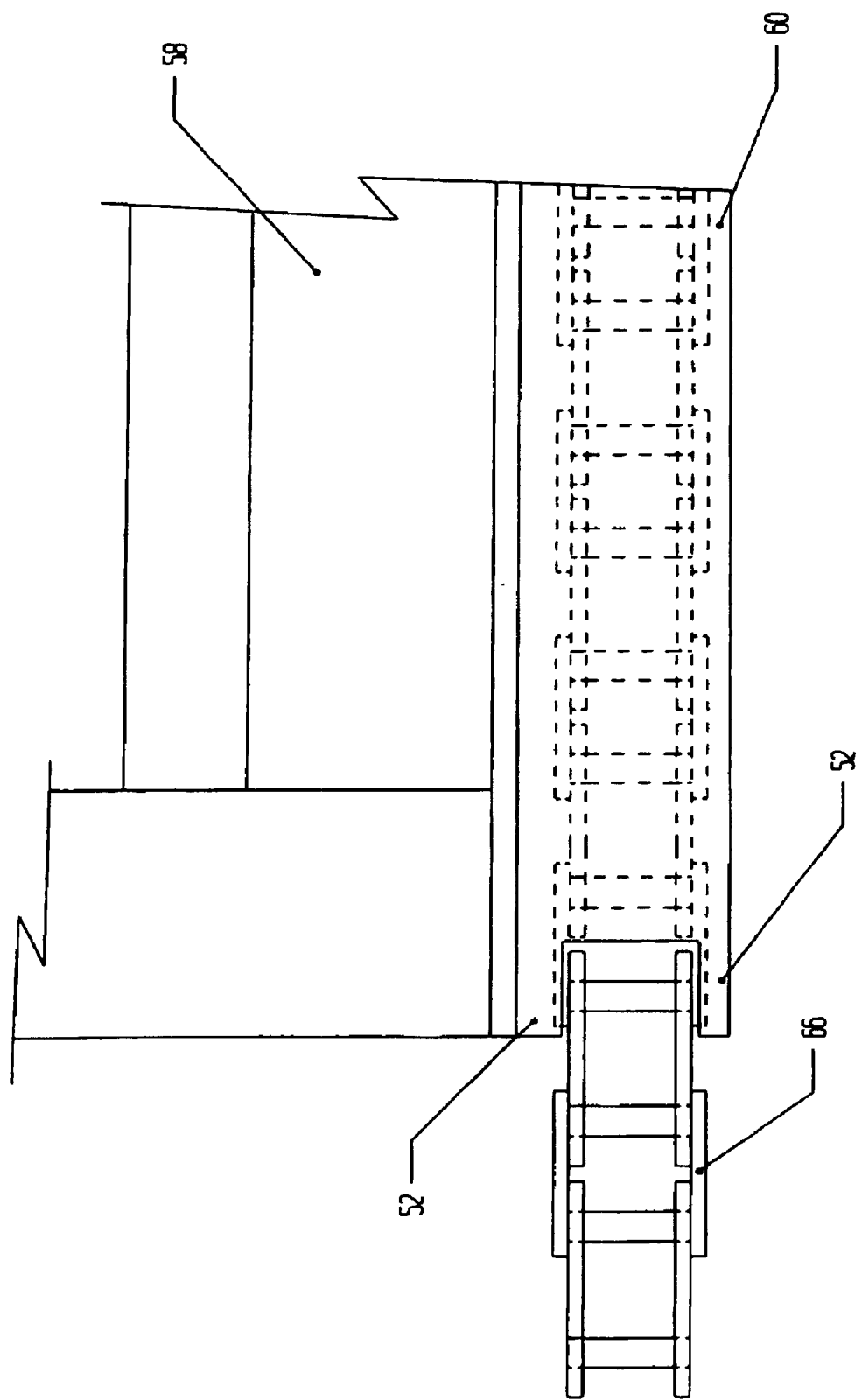
FIG. 20 is a detailed top view of the front of the moveable frame rail.
Figure 21:
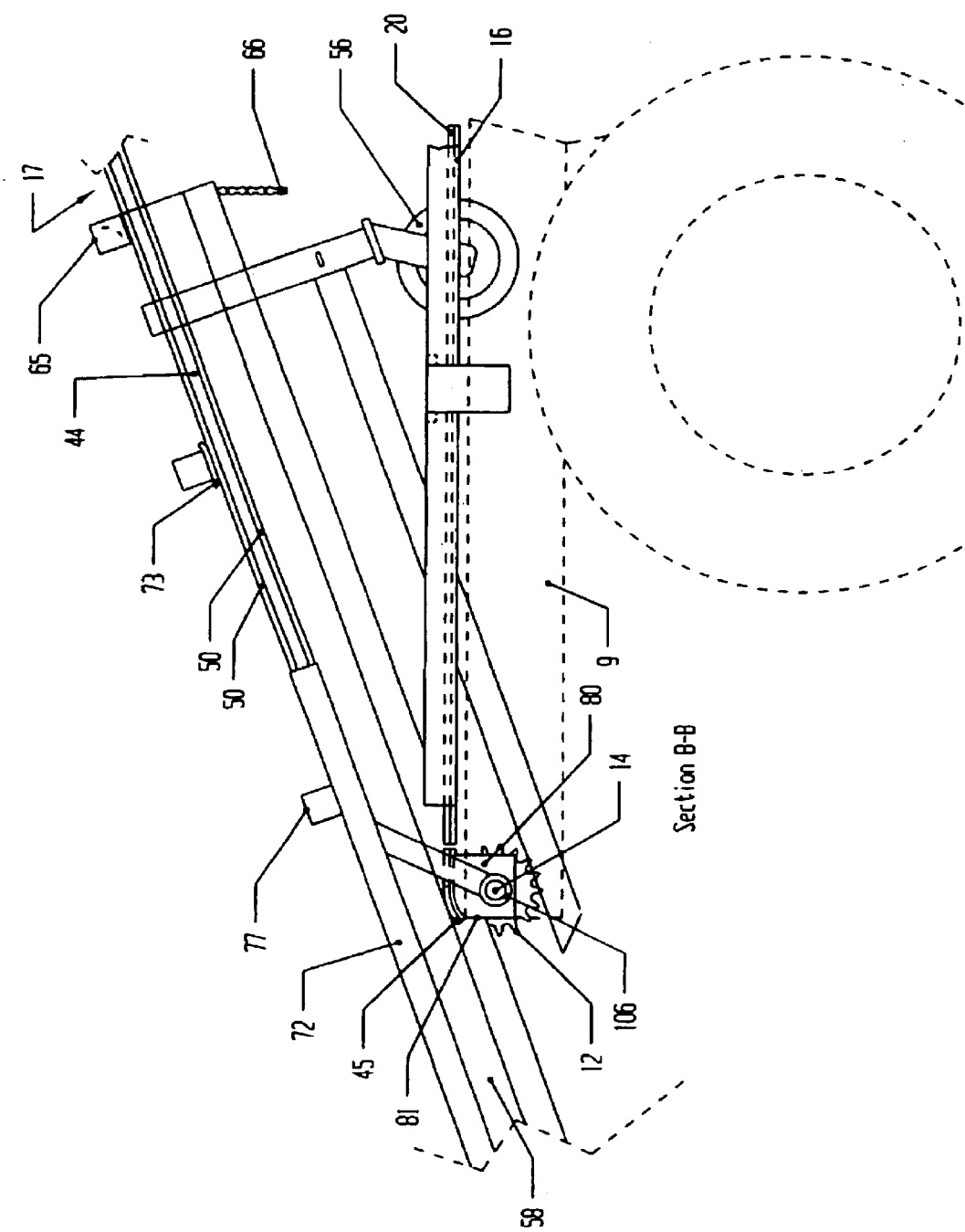
FIG. 21 is a cut away side view of the movable frame shown in FIG. 7, balanced on the stationary frame shown in FIG. 2.

As best seen in FIG. 21, the elevatable support 17 is pivotally attached to the axle 14 that is positioned at the rear end of the vehicle 13. The movable frame rail 58 pivots when loading or offloading on the surface of a slide 8 with the center of the circumference of the axle 14 being the center of the arc of the slide 8 (see FIG. 4). This creates a common pivot point for both the receiver 72 on the movable frame 11 and the elevatable support 17 thereby ensuring both alignment and non-binding movement between the elevatable support 17 and the receiver 72 (see FIG. 6) prior to interlocking and when interlocked. As best illustrated in FIGS. 2 and 19, a pair of springs 43 assist in lifting and holding the elevatable support 17 up by exerting a twisting force on a hinge pin 47 that is fixably attached to the arm 15. The outer coils of the springs 43 are attached to a bar 64 that is attached to the arm 37. This twisting action assists in opening the arms, 15 and 37, with the hinge pin 47 as the center axis. The lifting and maintaining of the elevatable support 17 vertical position may be accomplished by placing the springs in other areas, for example, over the cylinder 46 or to the frame 19 and lifting under the arms, 15 and 37, below the hinge pin 47. Those skilled in the art will recognize other means of assisting the lift and holding the elevatable support.

Figure 3:
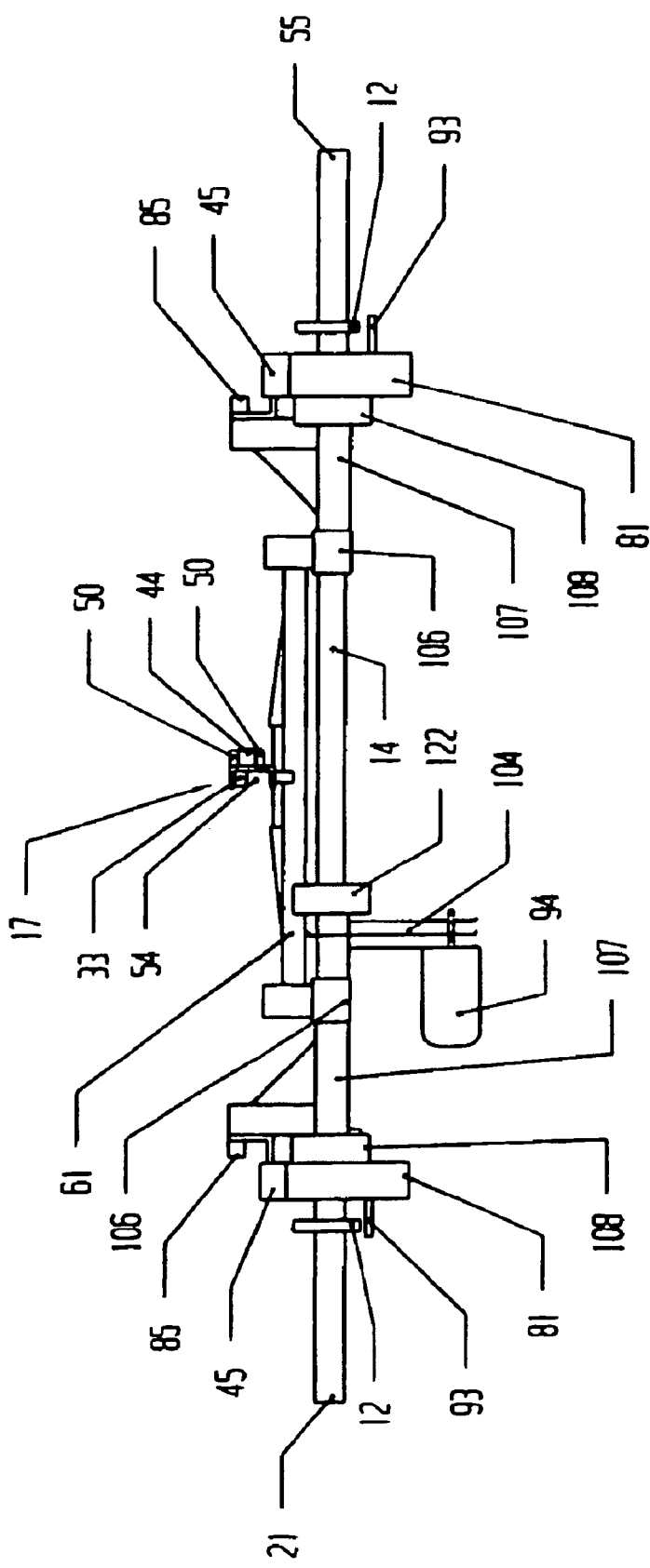
FIG. 3 is a rear end view of the rear block assemblies mounted on the rear of the vehicle.
Figure 4:
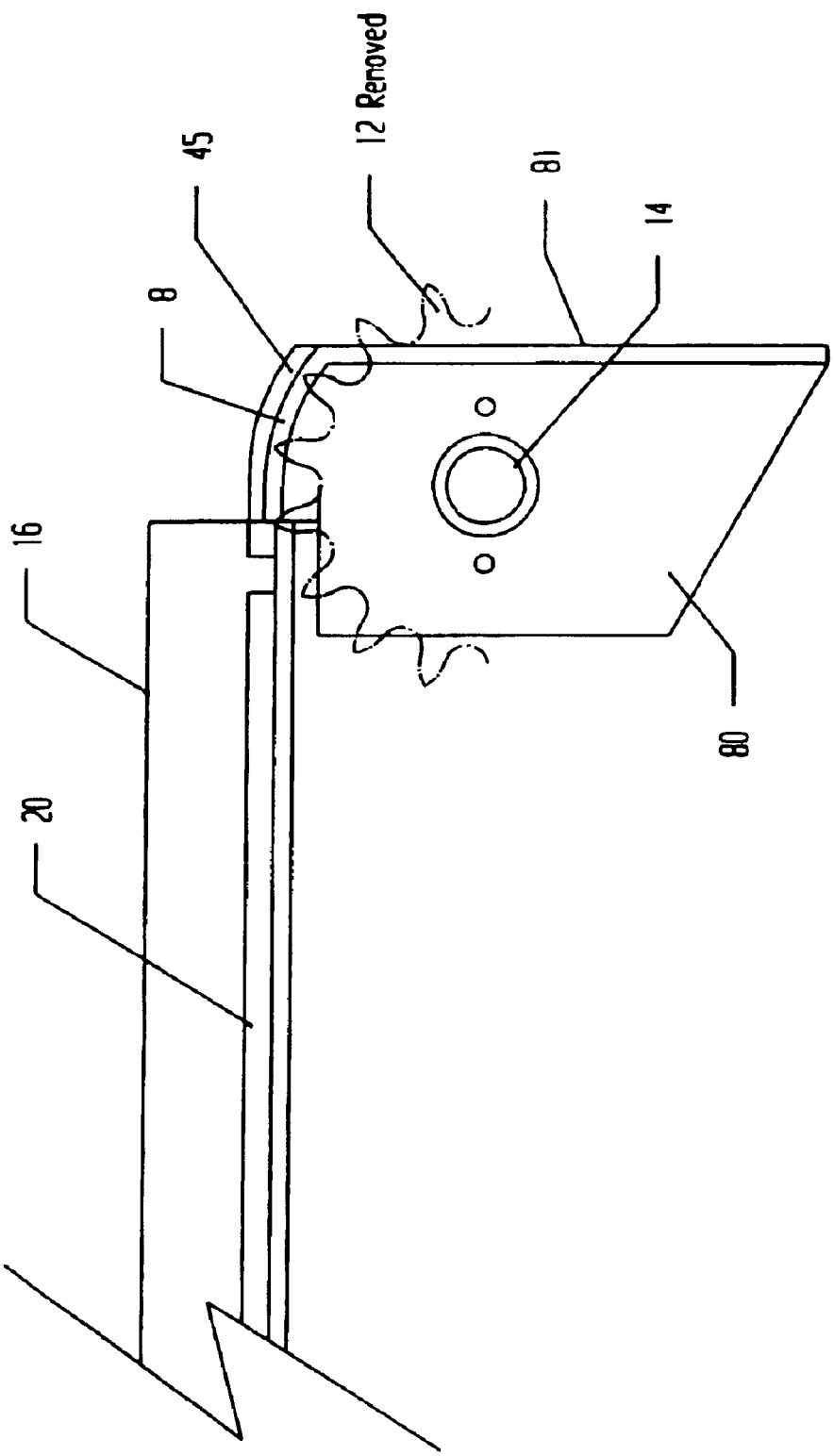
FIG. 4 is a simplified side view of the first embodiment showing the relationship between a rear block assembly and a frame rail.

As seen in FIGS. 2, 3 and 4, the frame 19 has a pair of rear block assemblies 80 generally located at the rear end of the frame rails 16 of the vehicle 13 and fixably attached to the chassis 9. Each rear block assembly 80 consists of a slide arrangement 8 that is designed to evenly distribute the load of the movable frame 11 during loading and unloading, and to distribute the overall weight of the loaded moving frame away from the sprockets 12 during the loading and unloading process. As best seen in FIGS. 3 and 4, the axle 14, the sprocket 12, the elevatable support 17 and the slide arrangement 8 are co-axially arranged, ensuring the vertical alignment of the elevatable support rail 44 with the receiver 72 (FIG. 12) while the slides 8, rails 16 and the frame rails 58 assume lateral alignment.

Figure 5:
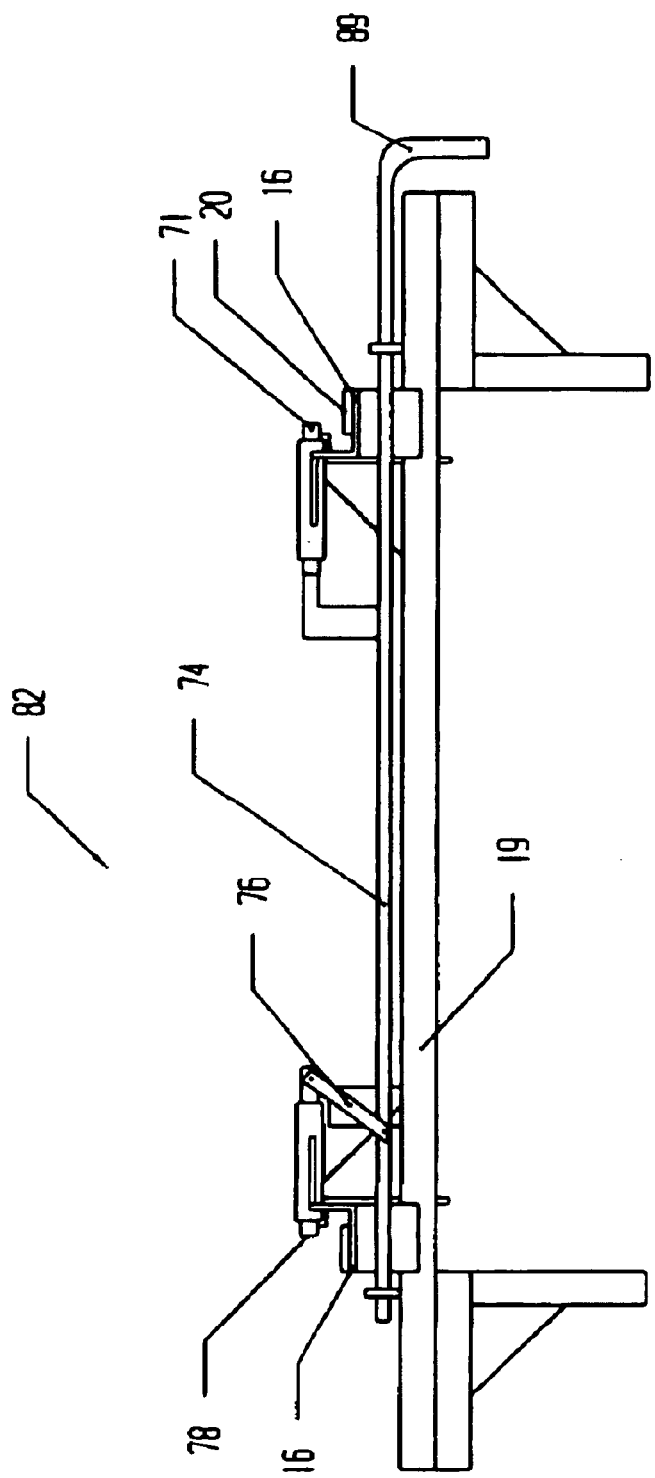
FIG. 5 is a simplified view of the locking pin assembly.

At the front end of the stationary frame is a locking pin assembly 82. As best seen in FIG. 5, the assembly 82 provides a manual positive lock system when the movable frame 11 is fully loaded on the stationary frame 19 and is a safety feature that prevents movement of the movable frame 11 into the cab of the vehicle during an accident. A rod 74, is attached to a first locking pin 71 and second locking pin 78, adjacent a handle 89. The first pin 71 is movable in the same direction as the rod 74. The second pin 78 is positioned away from the handle 89 and is attached to a fulcrum plate 76 which reverses the direction of the rod 74 during operation. As the rod moves in a first direction, the first pin 71 moves in the same direction, whereas the pin 78 moves in a second direction.

As best seen in FIGS. 3. 4 and 6, a pair of stop plates 81 in the rear block assembly 80, act as collision impact buffers to prevent the movable frame 11 from damaging the vehicle body when a movable frame stop plate 67 abuts the stop plate 81. Furthermore, the stop plates 81 and 67 allow precise location of the movable frame 11 on the frame 19 and also allows for precise alignment of the locking pin assembly 82 (see FIGS. 4, 5 and 12) on the frame 19 with a plurality of lock pin holes (not shown) on the movable frame 11. Slide 8 on the rear block assembly 80 are coated with the UHMW 45 that acts as a lubricant to assist the movable frame as it slides over the rear block 80.

The rear block assembly stop plates 81 are positioned rearward of the axle 14 yet forward of the most rearward teeth of the sprocket 12. As seen in FIGS. 1, 7, 8 and 17, this allows a cross member 65 and a front portion 25 of the rail 58 to be unobstructed by the stop plate 81 when lifting or lowering moveable frame 11 when tag chains 66 and or links 62 are engaged on teeth of the sprockets 12.

With the moveable frame 11 tilting backward, the front of the receiver 72 tilts up, and with the receiver 72 and the slide rail 44 interlocked, the elevatable support 17 also moves up. The elevatable support 17 in turn pulls on the arms 15 by an arm pin 48. In turn, the arm 15 pulls on the hinge pin 47 in turn pulling the lower arm 37 up with the lower end of the arms 37 connected to the sub frame cross member 1 with a hinge pin 49. The arms 15 and 37 hinge open with hinging taking place on the hinge pin 47. This action extends the hydraulic cylinder 46 as the ram 41 is connected to the arm 15 through the upper cylinder pin 39 and the barrel of the cylinder 42 is connected to lower arm 37 by a lower cylinder pin 51. An operator can allow the moveable frame 11 to tilt without further forward and rearward movement if frame 11 is in an unbalanced condition.

Referring now to FIGS. 1, 6, 7, 12 and 14, the movable frame 11 comprises a "skeleton body" type frame with a pair of longitudinal rails 58 which act as slides so as to guide the rails 16 on the frame 19. Disposed between, and parallel to, the rails 58 is the receiver 72 which is positioned across the under side of a plurality of cross members 77 and along a portion. of the frame 11 length. Mounted to the frame is the load 100 and a set of removable wheels 56 to allow movement. Those skilled in the art will recognize that other means for moving the frame 11 are available to implement aspects of the invention, for example, skid plates. The movable frame 11 has a front end portion 25 and a rear end portion 27. The front end portion 25 is disposed toward the rear of the stationary frame 19 during initial maneuvering. The load 100 is attached to the frame 11 with the front portion 25 of the box 100 positioned rearward of the front portion 25 of the frame 11. This positioning allows the movable frame 11, when on or off-loading, to be lifted or lowered without the box 100 contacting the tag chains 66 or the sprockets 12.

As best illustrated in FIGS. 1, 6, 8, 17, 20 and 21, the frame 11 has a tag chain 66 that is attached to a roller chain 83. The roller chain 83 is fixably attached to a roller chain frame 60, which in turn is fixably mounted to the frame 11. With the movable frame resting on level ground, the vertical distance between the bottom face of the portion of rail 58 that slides on the top of slide 8 and the bottom of the roller on the roller chain 83 is equivalent to the distance between the radiuses of the slide 8 and bottom of valleys, between the teeth, of sprocket 12. These equivalent measurements allow the frame rail to slide over the slide 8 and the rail 58 support the heavier loads. The curved nose 123 of the front portion of the rail 58 that slides over slide 8 is curved to allow the rail 58 to slide over slide 8 when initially loading a heavily loaded frame 11. A first link 62 of the chain 83 is positioned adjacent lips 52 that are supported on the frame 11. The lips 52 forwardly protrude from the roller chain frame 60 and over the top of the side plates of the link 62 and prevent the over stressing of the side plates. This reduces the possibility that the side plates may break during the lifting or lowering of the front portion 25 of the frame 11. One skilled in the art will recognize that the side plates are not designed for excessive force 90 degrees to the chain side plate. The tag chain 66 has an unattached end portion 63 that enables an operator to guide the tag chain 66 onto the sprockets 12 of the frame 19. The sprockets 12 are positioned such that the unattached end portion 63 of the chain 66 can be engaged on the sprockets without hindrance from other components. When the sprockets 12 are turned by the axle 14, the tag chain 66 is pulled tight in the direction of the wheels' rotation and serves to pull the loaded frame 11 toward and up onto the first frame 19. When not in use, the tag chains 66 are pivoted up and back on to the top of roller chain frame 60. This advantageously protects the chain from damage. There is a corresponding storage track 84 on the frame 19 which also acts as a housing for the tag chain 66 when the frame 19 is fully loaded with the movable frame 11.

Referring now to FIGS. 2, 3, 7, 14 and 17, a plurality of disposed tie-down brackets 85 on the frame 19 permit locking of the movable frame 11 to the frame 19 in the final loaded position. Disposed towards each of the four corners of the movable frame 11, the tie-down brackets 85 lock the movable frame 11 to the frame 19 to prevent vertical movement of the movable frame during motion of the vehicle over uneven ground. The movable frame 11 has a plurality of tie-down brackets 86 that cooperate with the tie-down brackets 85 on the frame 19. The forwardly disposed frame brackets, 85 and 86, are positioned lower than the rearwardly disposed frame brackets, 85 and 86, to allow the forwardly disposed frame brackets 86 on the movable frame 11 to slide under the rearwardly disposed brackets 85 of the frame 19 during the initial loading. In the final loaded stage, the brackets 86 are positioned directly under the corresponding stationary frame brackets 85. Advantageously, the brackets eliminate excessive noise between frame 11 and frame 19 when the vehicle is operating and also has the safety advantage of preventing a roll over of the movable frame 11 when loaded on the frame 19.

The movable frame 11 has wheels 56 on the frame 11 so that frame 11 can be moved relative to the stationary frame 19 prior to engagement. The wheels 56 are removable when the wheels are off the ground. The wheels 56 are removed by removing the hitch pin 113 from pin hole (not shown) in the wheel support tubing 114 and allowing the shaft of front wheel frame 57 to drop down out of the movable frame wheel support tubing 114, then replacing hitch pin 113 in pin hole. The vehicle 13 may be maneuvered to align to the moveable frame, such that if the wheels 56 are used on the rear of the movable frame 11, they are aligned such that they track straight and parallel to the lines of the movable frame rails 58. This wheel alignment encourages the movable frame 11 to remain in alignment with the frame 19 when loading and off-loading.

Referring now to FIGS. 1, 9, 10, 11 and 13, a pair of chain locking systems 10 are rearwardly mounted on the frame 19 and adjacent the rear wheel of the vehicle as each of the chain locking systems 10 comprises a sprocket 12, a movable shoe arm 22, a movable shoe 26, a sensing plate 32, a locking arm 28, a support member 88 and a pair of main springs 36 and 38, attachment bracket 93, slot 120, bolt 110, spring tensioning plate 35 and pin 119. The support member 88 has a first end portion 101 and a second end portion 102 and is fixably attached by attachment bracket 93 to the chassis frame 9. The first end portion has a slot 120 best seen on FIG. 13. Fixably attached to the first end portion 101 by a bolt 110 is the adjustable spring tensioning plate 35 and fixably attached to the spring tensioning plate is a pin 119. The pin 119 has two ends and each end projects from the side spring tensioning plate 35. The first end has a slot in the pin that the spring 36 is fixably attached to and the second end is positioned as a pivot for the arm 22 with arm 22 positioned in slot 120. The center portion of the support member 88 is a bushing 109 that encases the circumference of the axle 14 adjacent the outer end. The support member 88 allows axle 14 to rotate inside the bushing 109 additionally supporting the axle 14 by the chassis 9 when the front end portion 25 of the movable frame is being lifted during initial loading.

Figure 16:
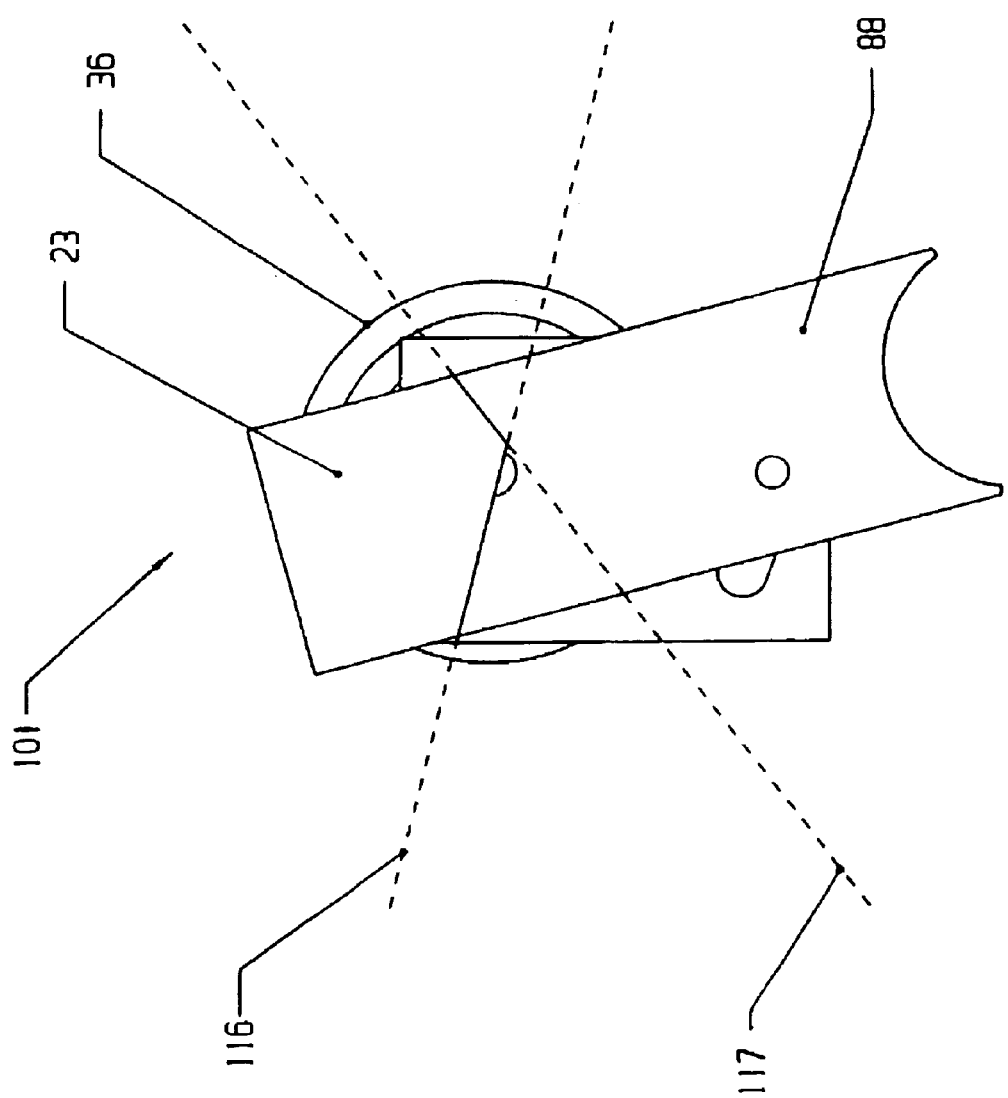
FIG. 16 is a schematic view of the stationary shoe showing shape.

The support member 88 allows the axle 14 to rigidly support a stationary shoe 23. Should the movable frame 11 rise, the roller chain frame 60 will rise up to the stationary shoe 23 thereby keeping the chain 83 engaged with the sprocket teeth 12. The stationary shoe 23 is advantageously placed and shaped so that it maintains the tag chain 66 or the roller chain 83 on the sprocket. Referring to FIG. 16, the stationary shoe 23 is positioned at an imaginary intersection point that is defined by the tangential angle of contact between the movable frame and the sprocket. This exact placement allows the movable frame 11 to maintain a maximum angle during loading, as shown by a pair of tangent lines 117 and 116. The stationary shoe 23 is also shaped so that it follows these tangent lines and this allows the movable frame 11 to rotate through all desired angles on the sprocket. In all cases, the stationary shoe 23 prevents the tag chain 66 and the roller chain 83 from skipping off of the teeth on the sprocket 12 by allowing minimum clearance between the stationary shoe 23 and the sprocket 12. The stationary shoe 23, with the combined strength of the axle 14 and the support 88, the frame 11 and a frame attachment bracket 93, prevents the movable frame 11 from rolling sideways off the vehicle should the other safeties fail.

Figure 13:
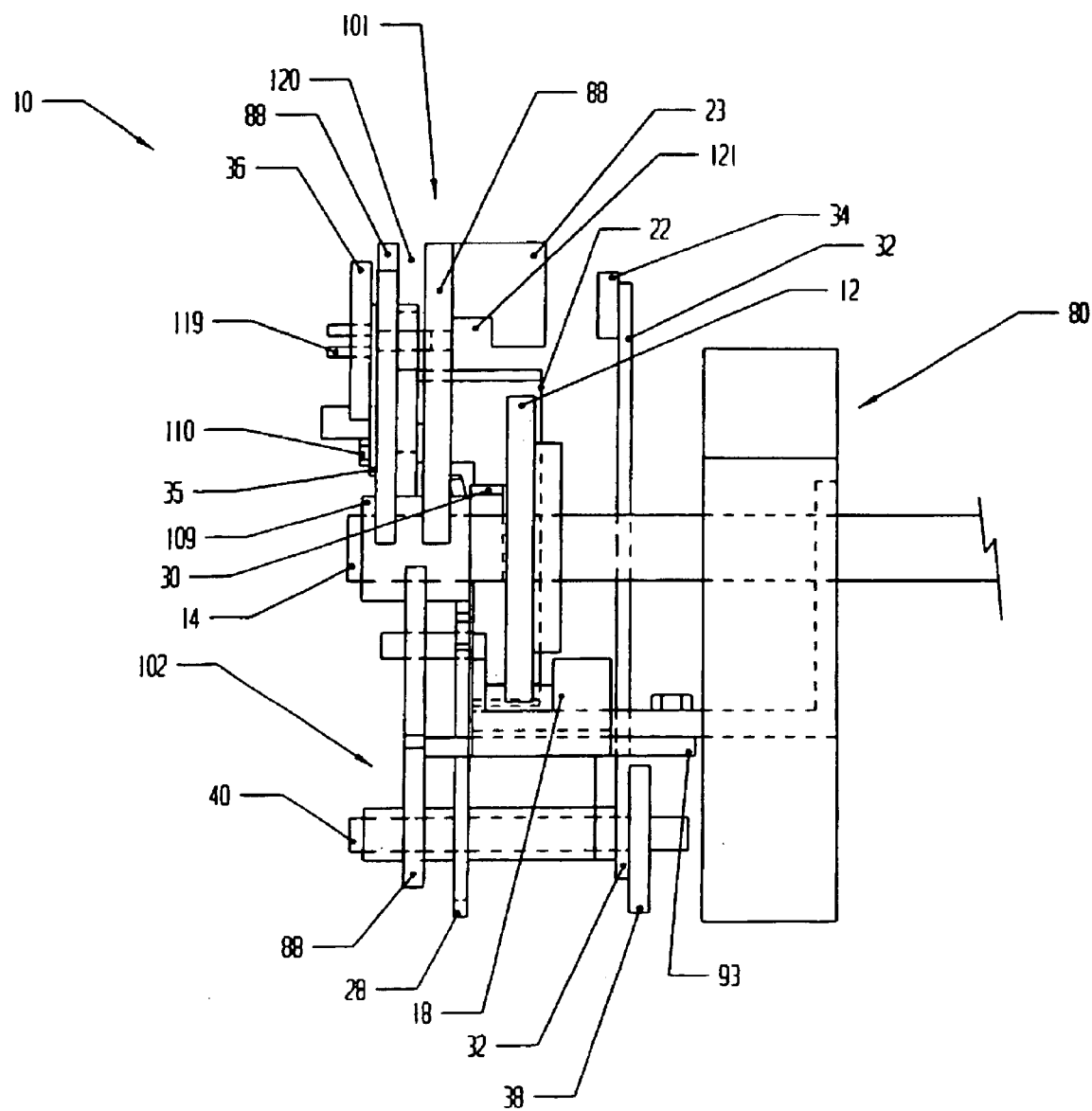
FIG. 13 is a schematic rear view of the first embodiment.
Figure 14:
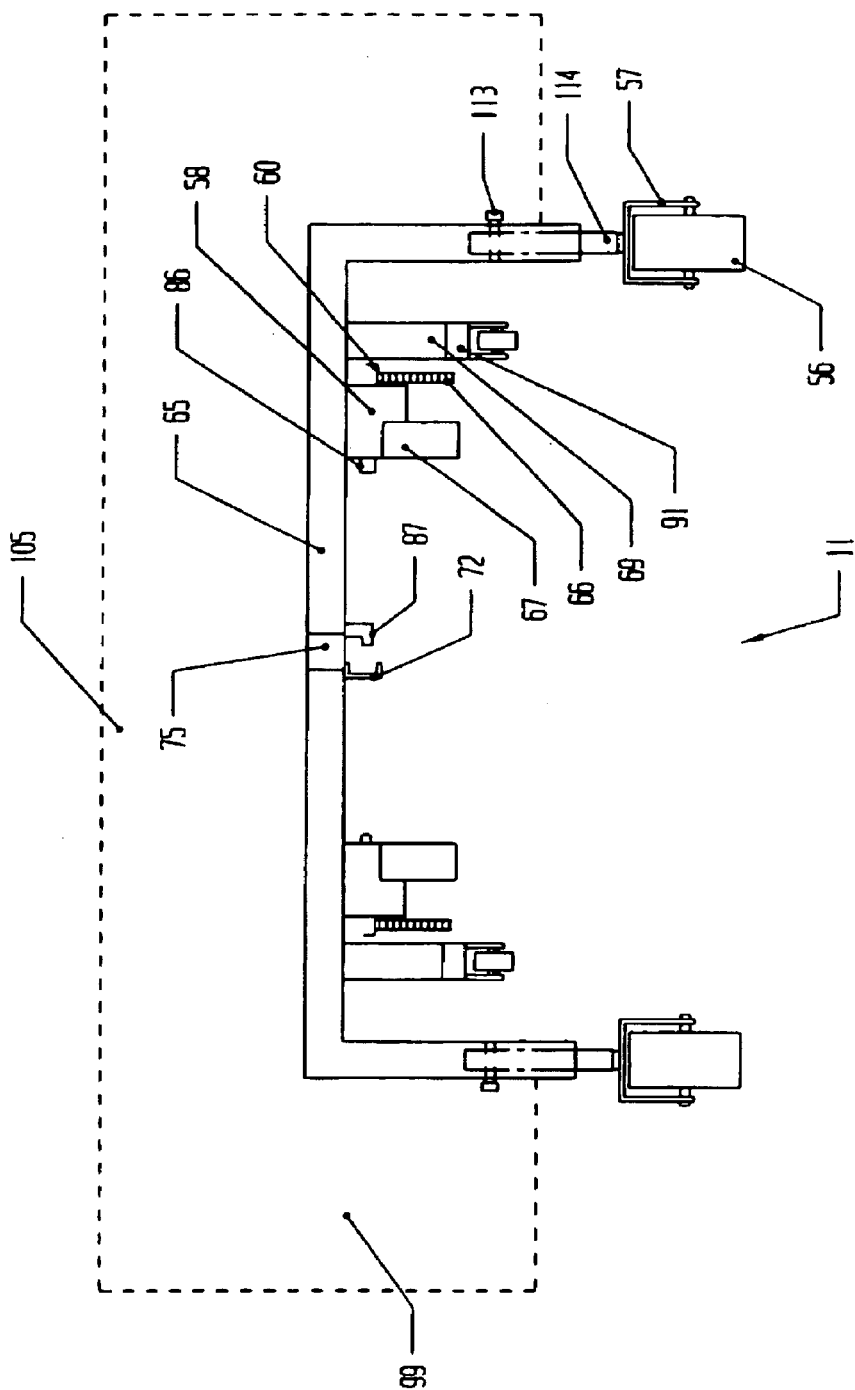
FIG. 14 is a front end view of the moveable frame.
Figure 15:
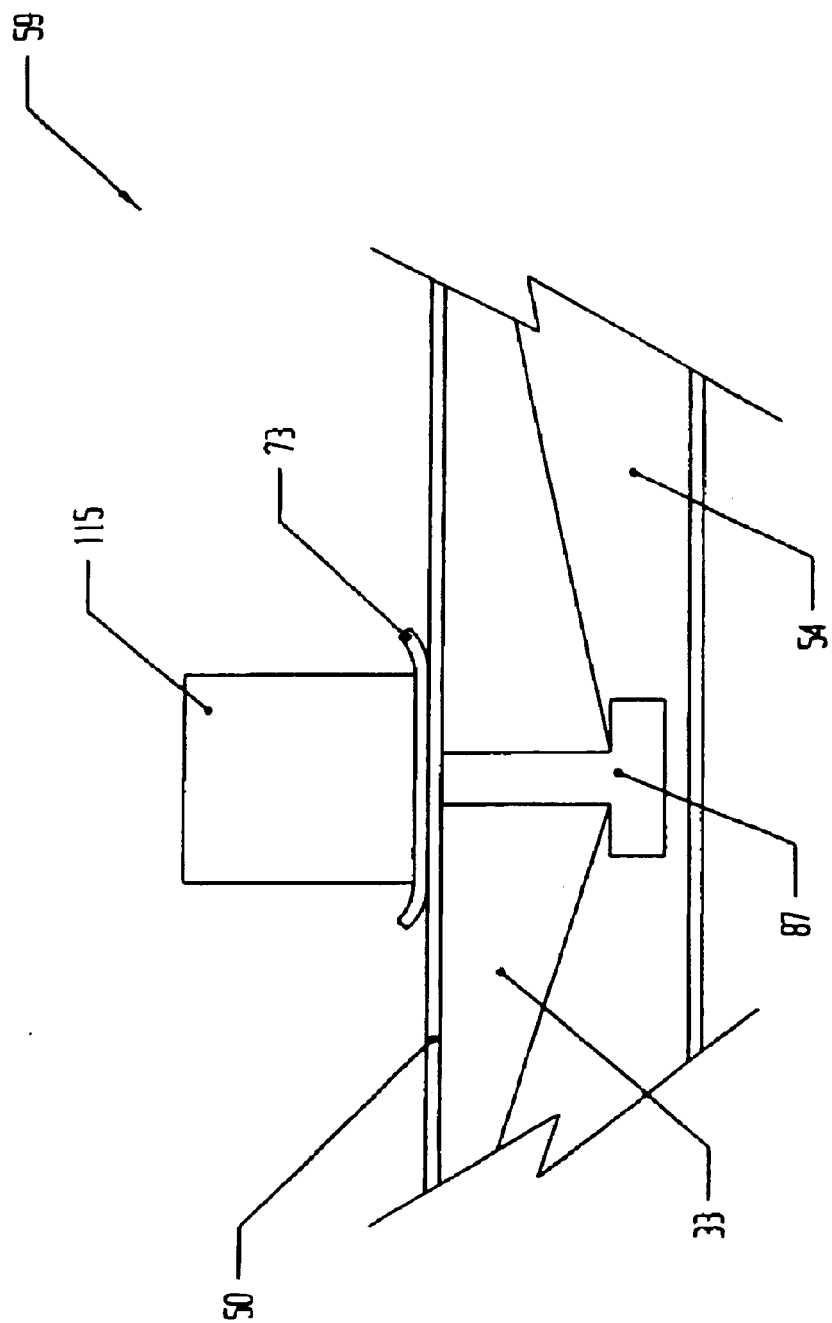
FIG. 15 is a simplified view of the internal ramp and lift tab.

Referring now to FIG. 13, the sensing/locking arm shaft 40 is rotatably mounted on the second end portion 102 of the support member 88. The locking arm 28, the sensing plate 32 and the main spring 38 are co-axially and fixably attached to the shaft 40. Those skilled in the art will recognize that the sensing plate 32 and locking arm 28 could be manufactured from a single plate. The outer coil end of spring 38 is fixably attached to an attachment bracket 93. The movable shoe arm 22 has a first end portion and a second end portion. The first end portion of the shoe arm 22 is urged towards the chain and the second end portion is pivotally attached to the first end portion in slot 120 of the support 88 by the pin 119.

Figure 9:
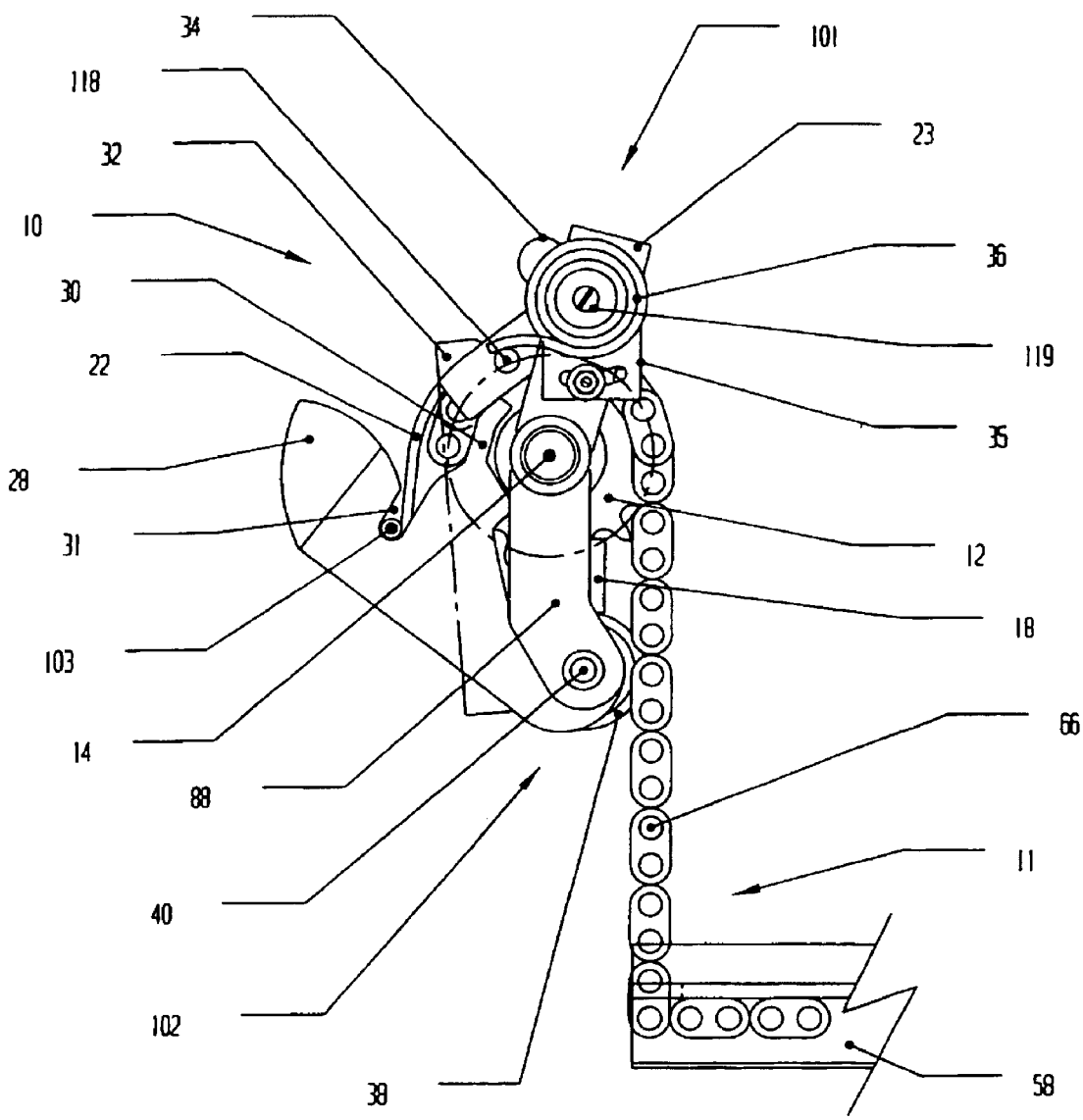
FIG. 9 is a simplified side view of the first embodiment in a locked position engaging the chain.
Figure 10:
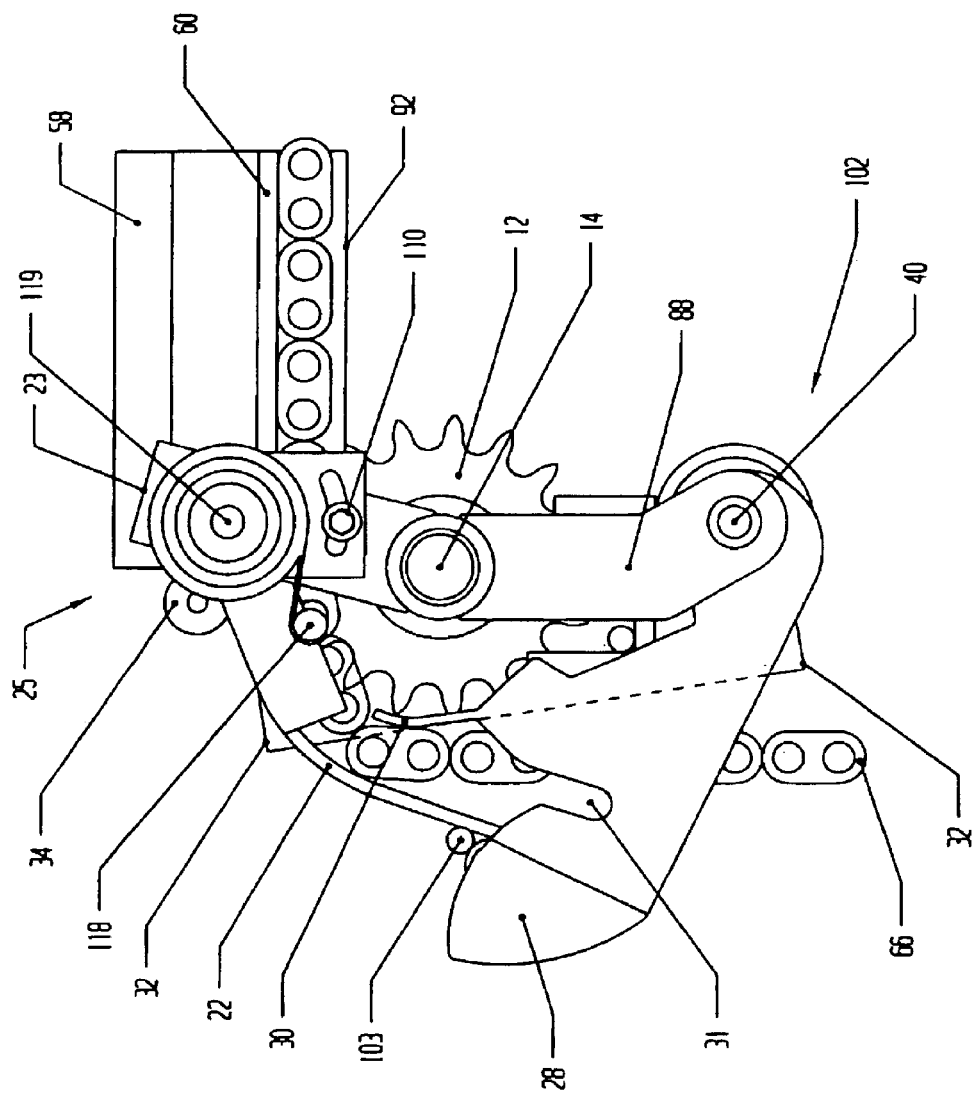
FIG. 10 is a simplified view of the first embodiment in a partially open position showing the frame engaging the locking system.
Figure 11:
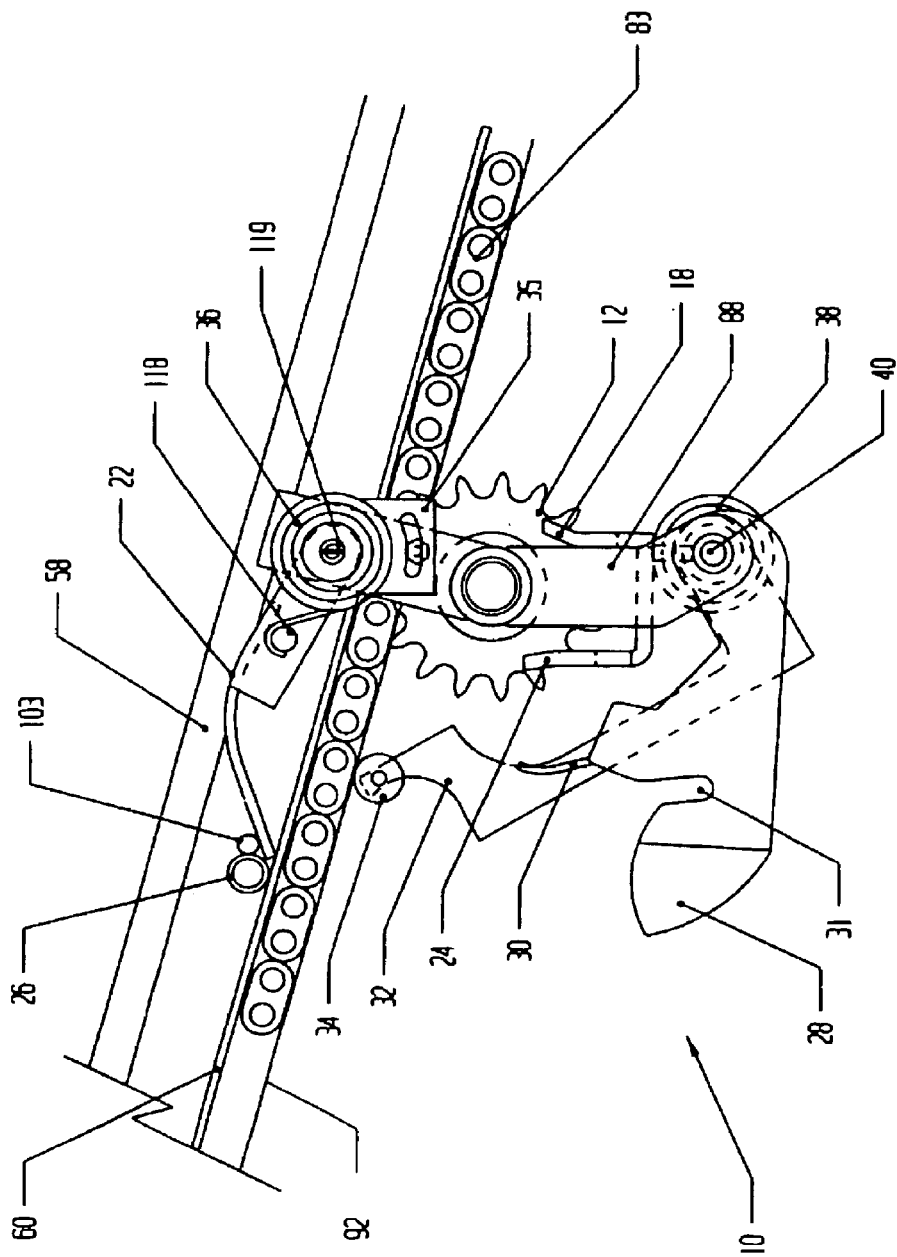
FIG. 11 is a simplified side view of the first embodiment is a fully open position.

Referring now to FIGS. 9, 10 and 11, the moveable shoe arm 22 has a projection 103 that extends outwardly therefrom. The movable shoe 22 has a second projection 118 and fixably attached to this projection is the outer coil of the spring 36. The locking arm 28 has a first end portion and a second end portion, the second end portion being fixably attached to the first end portion of the shaft 40 (FIG. 13). Furthermore, the locking arm 28 has a groove 31 that is machined into the body. The groove 31 is shaped so that when the shoe 22 and the arm 28 are sprung into a closed position, the groove 31 co-operates closely with the projection 103 on the shoe arm 22. The arm 28 also has a tab 30 that is shaped such that it pushes chain 66 off of the sprocket 12. The tab 30 also redirects the chain 66 back onto the teeth of the sprocket 12. The sensing plate 32 has a first end portion and second end portion. The first end portion of the plate 32 has a bearing 34 attached thereto and is urged upwards against the bottom side 92 (FIG. 11) of the movable frame rails 58. The second end portion of the plate 32 is fixably attached to the center portion of the sensing/locking plate shaft 40.

The movable shoe 22 spring tensioning can be adjusted by turning the bolt 110 to loosen the spring tensioning plate 35 and then swiveling the plate which in turn turns the center of the main spring 36. A front release fork 24 prevents the tag chain 66 from wrapping around the sprocket 12 during the initial chain engagement. A rear chain release fork 18 prevents the tag chain 66 from wrapping around the sprocket 12 after the movable frame 11 is lowered to the ground but before the sprockets 12 allow the tag chain ends to drop to the ground.

Figure 7:
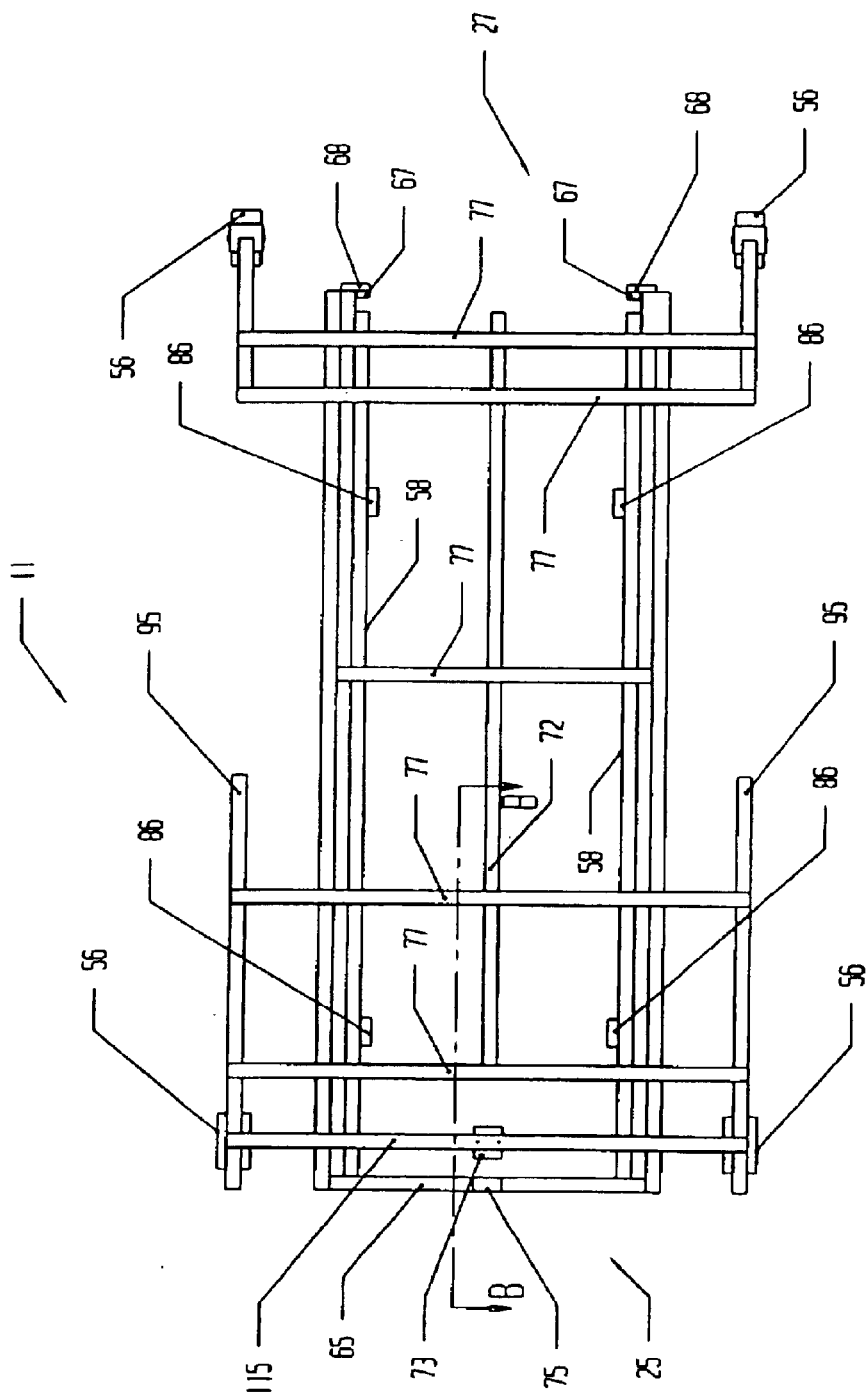
FIG. 7 is a top view of the movable frame.

Referring to FIGS. 3, 4 and 7, during final engagement of the movable frame 11 with the frame 19, a pair of stop plates 68 at the rear end portion 27 of the moveable frame 11 abuts a pair of stop plates 81 in the rear block assembly 80. Advantageously, the stop plate face 68 is also covered with UHMW 67 to prevent the rubbing noise of metal on metal when the vehicle is moving.

Operation

Figure 8:
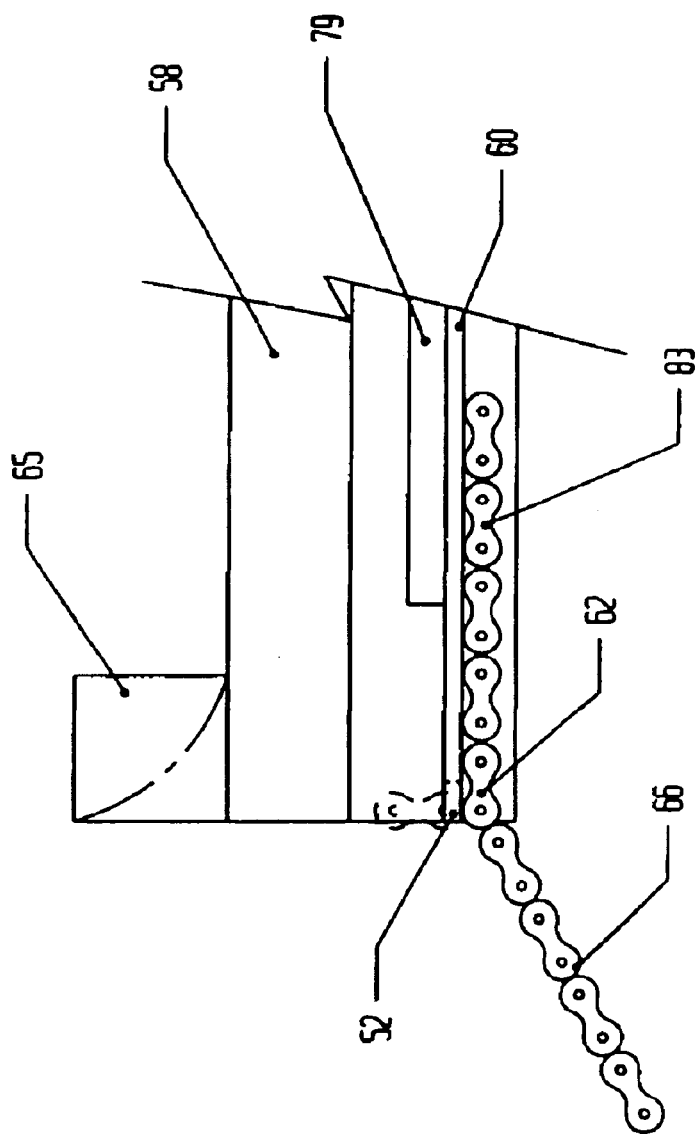
FIG. 8 is a simplified side view of the chain detail attached to the movable frame.

With reference to FIGS. 1, 8 and 9, the operation of the first embodiment will now be described. With the movable frame 11 positioned on the ground the operator may back the vehicle 13 up to the movable frame 11. The tag chain 66 is placed onto the sprocket 12. The tag chains 66 are aligned to the rear of the stationary shoe 23 so as to line the end portion 63 of the chains in the same clock position on the sprockets 12. The operator activates the motor 94 from an electrical control box (not shown) which releases an integral motor brake and begins rotation of the axle 14.

As the sprockets turn, the tag chain 66 tightens and the front-end portion 25 of the movable frame 11 begins lifting off of the ground. At this point, the weight of the movable frame 11 is distributed between both of the rear wheel assemblies 56, the ground, the two tag chains 66 and the sprockets 12. The tag chain lifting force is transferred 90 degrees to the first link 62 of the roller chain 83. Each sprocket 12 has about 180° of contact with the tag chain 66. This is sufficient contact to allow safe lifting or lowering of the movable frame 11. At this stage, the front release fork 24 prevents the chain 66 from wrapping around the sprocket 12.

The chain 66 begins lifting the weight of the movable frame 11. The tag chain/locking process remains in place until the weight of the loaded movable frame 11 is supported by the rear block assembly slide 8. This advantageously eliminates the opportunity of the tag chain 66 slipping off the sprocket 12 and dropping the loaded movable frame 11. The tag chains 66 are prevented from working off the sprockets 12 by the movable shoes 26 that are positioned directly above the sprocket 12 and are held in position by the locking arms 28. The chain locking mechanism is a positive tag chain-to-sprocket locking device that reduces or essentially eliminates the possibility of the tag chain 66 being pulled off the sprockets 12 when the locking arm 28 is in position.

Referring to FIGS. 2, 7, 8, 9 and 10, during the mounting phase of the operation, the movable frame 11 continues being pulled up and forward towards the frame 19 with two tag chains 66 and two roller chain links 62 now in contact with sprockets 12. The two frame rails 58 begin to slide over the slides 8. The frame rails 58 and slide 8 take the weight of the front of the movable frame 11, which removes the weight off the tag chain 66, the roller chain frame 60, sprocket 12 and drive axle 14.

Advantageously, as the movable frame 11 moves further forward, the roller chain frame 60 moves under the stationary shoe 23 thereby preventing the movable frame 11 from tipping or rolling off sideways. Furthermore, this prevents the roller chain frame 60 from lifting up to a point where the chain links could slip a tooth on the sprocket 12 and ensures that the movable frame cannot fall back off the slides 8. This guide system of 58, 8 and 16 maintains the movable frame in a straight line with the stationary frame 19.

At this stage, the operator removes the wheels 56 at the front of the moveable frame 11 to prevent them from interfering with the vehicle tires 29.

Referring to FIGS. 9, 10, 11 and 13. As the vehicle 13 has two essentially identical locking systems 10 mounted rearwardly, only one will be described in detail.

The front-end portion 25 of the rail 58 contacts the sensing plate 32 and pivots the sensing plate forwardly and downwardly. The sensing plate 32 rotates the shaft 40 against the spring tension of the main spring 38. Rotation of the shaft 40 also pivots the arm 28 forwardly and downwardly. The groove 31 in the arm 28 pivots clear of the projection 103 on the arm 22, thereby releasing the arm 22. As the movable frame 11 continues advancing, the sensing plate 32 continues to pivot downwardly, which in turn rotates the shaft thereby moving the arm 28 further forwardly and downward and increasing the tensioning of spring 38. The arm 28 pivots forward and down with the tab 30 on the arm 28 pushing the tag chain 66 forward and off the teeth of the sprocket 12.

Methods other than the sensing plate 32 may be used to sense the frame 11 when loading or off-loading and to activate the locking plate 28. This timing and activation may be accomplished electrically by the use of limit switches that sense a lower portion of the surface 92 of the rail 58 and in turn the limit switches may control the operation of an electric or mechanical solenoid or small gear motor that closes or opens locking plate 28. The "claim" for the first embodiment must be broad enough to cover this type of operation.

As the chain 66 is being pushed forward off the sprocket 12, the chain 66 contacts the arm 22 which is still in a closed position. The forward advancement of the chain 66 pushes the movable arm 22 forward and open, which overcomes the force of the spring 36. The tab 30 of locking arm 28 has now pushed the tag chain 66 forward said off the teeth of sprocket 12 and tab 30 holds the chain forward and away from the sprocket 12, and in turn the chain 66 holds arm 22 forward and up. With the front of movable frame rail 58 still moving forward, the arm 22 is lifted by the roller chain frame 60 on the side of the frame rail 58 as the roller chain frame 60 slides under the arm 22. The arm 22 is lifted by the forward sliding action of the roller chain frame 60 and movable shoe 26 rests on the top of the frame 60 as it moves forward. With the frame rail 58 still advancing, the rail 58 slides over the plate 32 and bearing 34. The bearing 34 rolls along the bottom side 92 of rail 58 for the remainder of the operation.

The tab 30 on the arm 28 holds the tag chain 66 forward and away from the sprocket 12, while the frame rail 58 advances. This prevents the chain 66 from hanging or "welding" to the sprocket 12. With the forward movement of the frame rail 58, the tag chain 66 is moved forward and away from the tab 30.

Advantageously, slot 31 is so machined that when the movable shoe arm projection 103 is in a locked position with the locking arm slot 31, there is a space between the chain 66 and arm 22 to prevent excessive wear.

For operation of the chain locking system 10 in reverse, the process described above is essentially reversed. During rearward movement of the frame 11, for example in the off-loading procedure, the main springs 36 and 38 urge the arm members 22 and 28 into a closed position when the loose tag chain 66 re-engages the sprocket 12. The shoe 23 that is attached to the first end portion 101 of the support member 88 prevents the chain from skipping the teeth on the sprocket 12. Furthermore, the stationary shoe 23 prevents body rollover when off-loading the movable frame 11 from the stationary frame 19. In the fully opened position, the shoe 23, and the arms 22 and 28 allow the chain 83 to move freely with the sprocket 12. As the movable frame 11 moves rearward with the tag chain 66 approaching the sprocket 12, the tag chain 66 contacts the locking arm tab 30. The roller chain frame 60 begins to slide from under the movable shoe 26 and arm 22, and the movable shoe 26 and the arm 22 pivots down and contact the top of the tag chain 66 and tag chain 66 is pressured down against the tab 30. With the sensing plate 32 following the contour of the rail 58, the tab 30 pivoting down and rearward and to the closed position allows the tag chain 66 to lay onto the teeth of the sprocket 12. The tag chain 66 is urged on to the teeth of the sprocket 12 by the spring-tensioned arm 22. With the tag chain 66 engaging on the sprocket 12, the groove 31 of the spring-tensioned locking arm 28 pivots over projection 103 on the moveable arm 22 and the locking system is again closed and locked.

The stationary shoe 23 is positioned such that at any angle of loading, the shoe 23 acts as a secondary hold for the movable frame 11 to the stationary frame 19 and thereby positively locks the roller chain 83 to the teeth of the sprocket 12. The stationary shoe 23 also acts as a secondary hold of the tag chain 66 to the teeth of the sprocket 12 during lifting and lowering of the front end portion 25 of the movable frame. Advantageously, if the locking system 10 were to fail or a load was loaded or off-loaded with the system unengaged, the tag chain 66 would still be secured by the stationary shoe 23.

Referring to FIGS. 14, 17, 18 and 19, with the frame 11 still moving forward and the rear wheels 56 still on the ground, the movable frame cross member 65 moves over the elevatable support 17. With the rearward portion of the elevatable support 17 rotatably attached to the axle 14, and if the forward portion of the UHMW 50 on top of slide rail 44 is too high for the slot 75 to clear, the slide rail 44 will be pushed, in turn pivoting the elevatable support 17 down by the slot 75 and by the weight of the movable frame 11. A lift plate 87 enters the rearward disposed end of the channel, 54 and alignment plate 73 slides over top of the slide rail 44. If the slide rail 44 is still too high, the alignment plate 73 pushes on the slide rail 44 and the elevatable support 17 pivots further down. If the elevatable support 17 is low, the lift plate 87 slides along the inside top lip of the channel 54 and lifts and pivots the elevatable support 17 upwardly as the movable frame moves forward. The lift plate 87 slides along and under a tapered internal ramp 33 and lifts and pivots the elevatable support 17 higher. With the elevatable support 17 height finely adjusted, the rail 44 aligns with the receiver 72. The movable frame 11 slides further forward and the front portion of the receiver 72 slides and interlocks over the rear disposed portion of the elevatable support rail 44, that which is coated with UHMW on both sides. With further forward movement of the movable frame 11, the receiver 72 slides further forward over the rail 44.

The elevatable support guide system 59 along with the slot 75, the lift plate 87 and the alignment plate 73 allow various lengths of frames to be loaded on the same stationary frame. When the frame 11 is off-loaded the elevatable support 17 maintains this angle. When a different length of frame 11 is on-loaded the angle of loading changes. The elevatable support may be re-adjusted by the above components allowing this new receiver to align with the elevatable support with no manual labor required.

Figure 12:
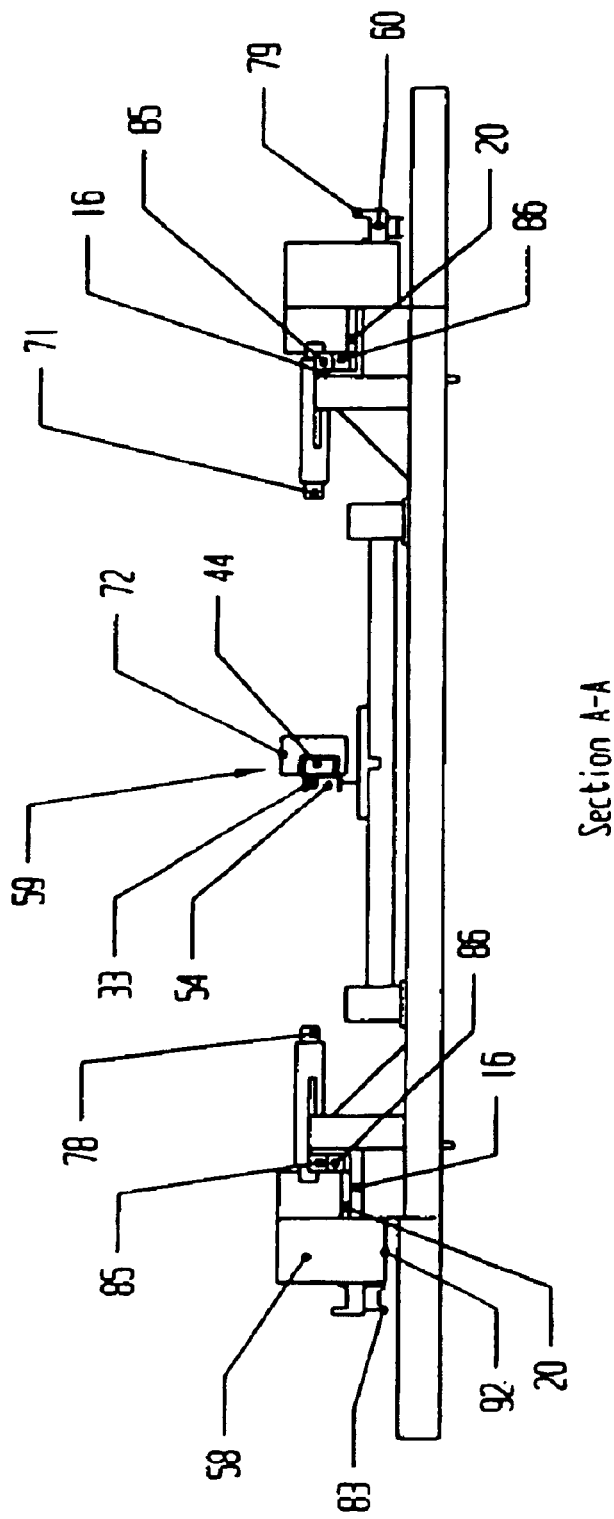
FIG. 12 is a simplified end-on view of the moveable frame loaded on the stationary frame showing the interlocking of the rail systems.

As best seen in FIG. 21, the movable frame 11 is balanced above the rear block assembly slide 8 whereupon only the slides 8 on the rear block assemblies 80 are in contact with rails 58. The receiver 72 is interlocked with the rail 44 and the movable frame rails 58 are straddling the rear portion of the stationary frame rails 16. As the movable frame 11 is moved forward so that the center of gravity and weight is passed over the slides 8, the weight is transferred from the rear wheel assemblies 56 to the elevatable support 17. The elevatable support 17 allows the weight to drop down onto the stationary frame 19 in a controlled manner by the resistance of the hydraulic cylinder 46, flow restrictors and valves. The movable frame 11 is eased down onto the stationary frame 19 with the movable frame rails 58 resting on top and straddling the rails 16, thereby preventing lateral movement of the movable frame 11 when travelling (FIG. 12). The tag chains 66 are pulled up onto the storage tracks 84 as the movable frame 11 continues forward. The storage area on top of the roller chain frame 60 is only used when the movable frame 11 is off the vehicle 13.

One skilled in the art will understand that the storage track 84 may be omitted. The top of the roller chain frame 60 along with the side bar 79 on the movable frame 11 may be used in place of the storage track 84. The side bar 79 makes a storage track for the tag chain 66. The bar 79 moves through the stationary shoe groove 121 (FIG. 13) when the movable frame 11 is loaded or off-loaded. This track may be necessary when loading and off-loading because when the movable frame 11 is moving on top of the stationary frame, the hanging tag chain 66 may catch, or hang up, on the vehicle suspension on parts of the chassis 9. In loading the operator may be required to manually place the tag chain 66 into the storage track roller chain frame 60. In off-loading, the tag chain 66 may be removed from the top of the roller chain frame 60 by the movable shoe 26. With the movable shoe 26 on the top of roller chain frame 60 the shoe 26 pushes the tag chain 66 off of the roller chain frame 60 as the movable frame moves in rearward direction.

As best illustrated in FIGS. 2, 5, 6, 11, 12 and 21, the stop plates 68 prevent the movable frame from being pushed forward into the cab of the vehicle 13. Advantageously, the stationary shoes 23, the movable shoe arms 22, the rear upper tie down brackets 85 and the rear lower tie down brackets 86, the receiver 72 and the elevatable supports 17, are so configured that they prevent the movable frame stop plates 68 from lifting over the stop plates 81 in an accident. The manual locking mechanism 82 is used to lock the movable frame 11 in the loaded position. Moving the handle 89 into the locked position causes the pins 71 and 78 to move into the locking pin holes in the movable frame 11.

Referring to FIGS. 2, 6, 7, 14, 17 and 18, the movable frame 11, may have fender components that hang lower and in front of the rear vehicle tires 29. The ramp system for on and off-loading of a fender body comprises a pair of lower fender slide frames 95, a pair of slide posts 69 and a pair of roller posts 91 that are located on the movable frame 11. A pair of ramps 90 are correspondingly located on the frame 19. The frame components protect the fenders 99 of the box 105 of the movable frame 11 when loading and off-loading. One skilled in the art will recognize that there are many types of fender bodies, for example, a standard fleet slide or step side pickup box body, a utility box body, catering truck bodies, motor home bodies and passenger bodies to name only a few.

The lower fender slide frames 95 protect the fenders 99 of the body. The fender slide frames 95 is slightly lower than the fenders 99. The slide frame 95 is supported and attached to the movable frame cross members 115 and the cross members 77. The lower fender frames 95 shown, work as a slide system that slides across the top of the rear tire 29 when loading or off-loading. The balance point of the movable frame 11 at the time of loading or off-loading determines if the slides 95 contact with the tires 29.

The slide posts 69 slide up or down the topside of the rearward angled portion of the ramps 90. The slide posts 69 are shorter than the roller posts 91 located forward therefrom on the frame 11. The bottom end of the shorter slide posts 69 is high enough to contact the top side of the sloped rear section of the ramps 90 when the frames 95 are sliding forward on the tires 29. The front portion 25 and the roller posts 91 of the frame 11 are raised as the slide posts 69 slides forward and up the ramps 90. The longer roller posts 91 are raised to a position where they contact the top sides of the sloped rear sections of the ramps 90.

The longer roller posts 91 lifts the frame 11 high enough so as to maintain necessary clearance between the front of the wheel wells 98 and the tires 29. Depending on the weight, the balance point and the speed at which the frame 11 is on or off-loading, the setting of the controls of the hydraulic cylinder 46, plus the vehicle chassis suspension, slide post 69 may or may not be used.

For off-loading, the slide posts 69 carry the movable frame 11 when the roller posts 91 roll off of the sloped rear section end of the ramps 90 to a point where either gravity tilts the movable frame 11 up or the frames 95 contacts the tires 29. The slide posts 69 could also be equipped with rollers.

The roller posts 91 carry the movable frame 11 as it rolls up and down the ramps 90 during loading or off-loading. The roller posts 91 carry the load weight at different times depending upon the weight, balance point and speed at which the frame 11 is on or off-loading, the setting of the controls of the hydraulic cylinder 46, plus the vehicle chassis suspension.

By eliminating the rear sloped section of the ramps 90 and extending the horizontal section of the ramps 90 rearwardly away from the rear of tire 29, the slide post 69 and the lower fenders' slide frames 95 may be eliminated, providing the design of the vehicle chassis 9 is such that adequate clearance is maintained between the top of the tires 29 and the ramps 90 when the vehicle is loaded and in motion. One skilled in the art would recognize that the balance point is such that the roller posts 91 would be positioned over the ramps 90 when the center of gravity of the fender body 105 is moved over the rear block assembly slide 8.

If the fully loaded movable frame 11 begins to off-load, the roller posts 91 come into contact, rolling rearward and upward on the top side of the front angled portion of the ramps 90, thus lifting the front portion 25 of the movable frame 11. The rearward portion 27 of the rails 58 slide and pivot on the rear block assembly slides 8. The movable frame 11 and the receiver 72 lift the elevatable support 17 up as the receiver 72 slides along the slide rail 44.

Figure 6:
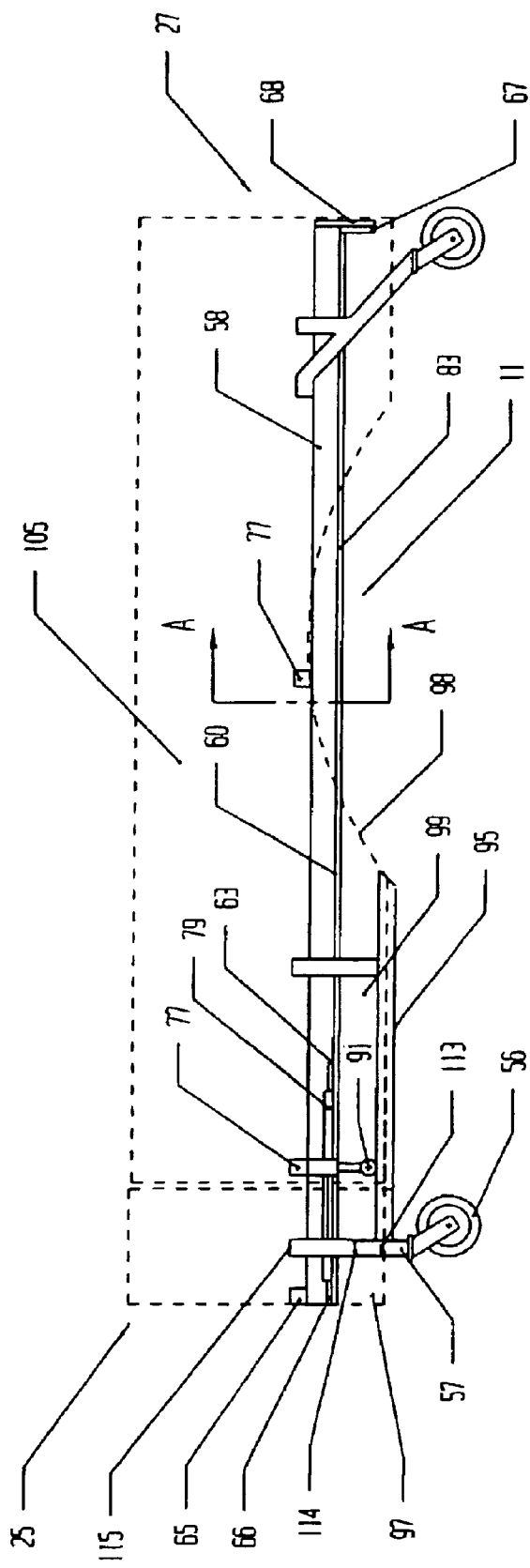
FIG. 6 is a side view of the moveable frame.
Figure 17:
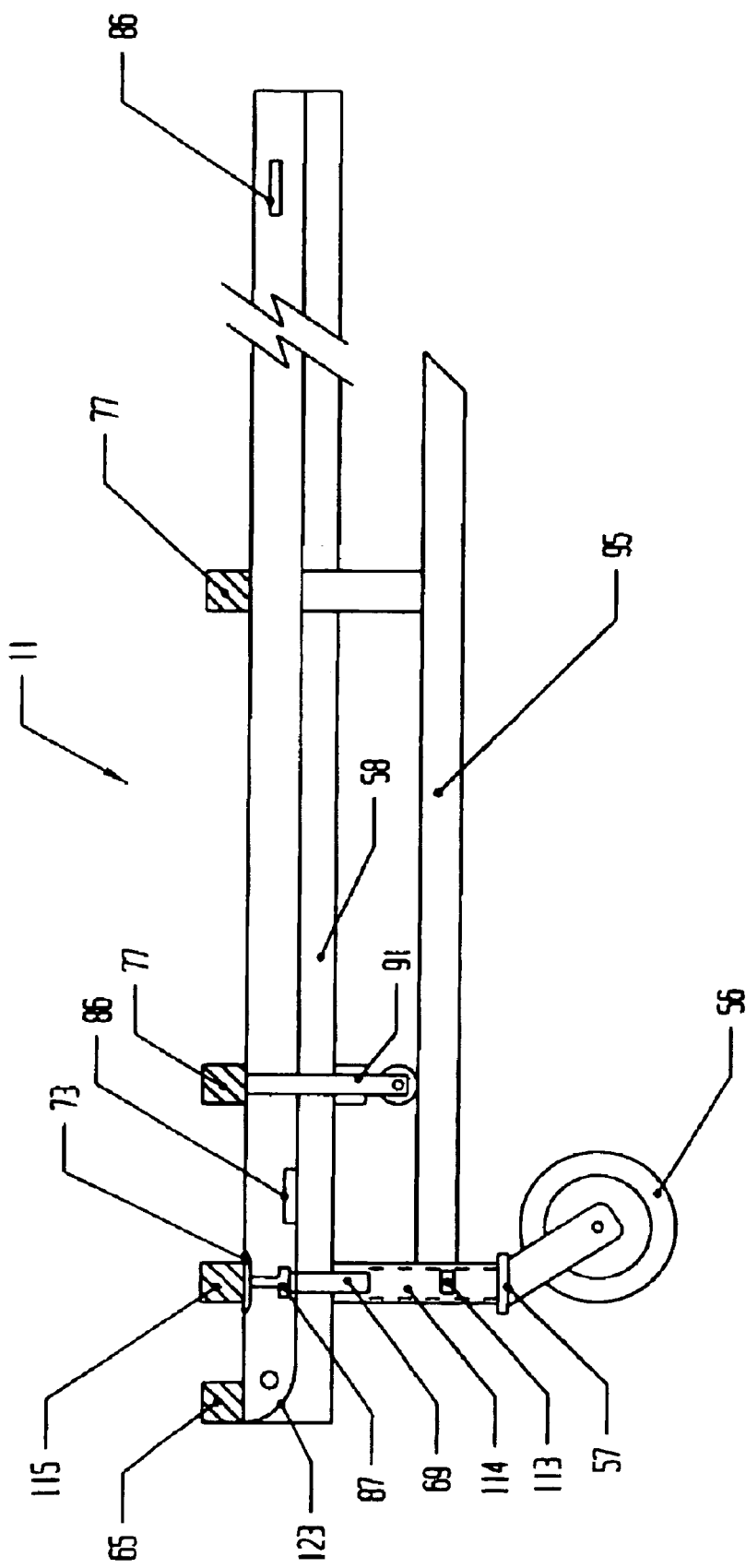
FIG. 17 is a side view of the front end of the moveable frame.
Figure 18:
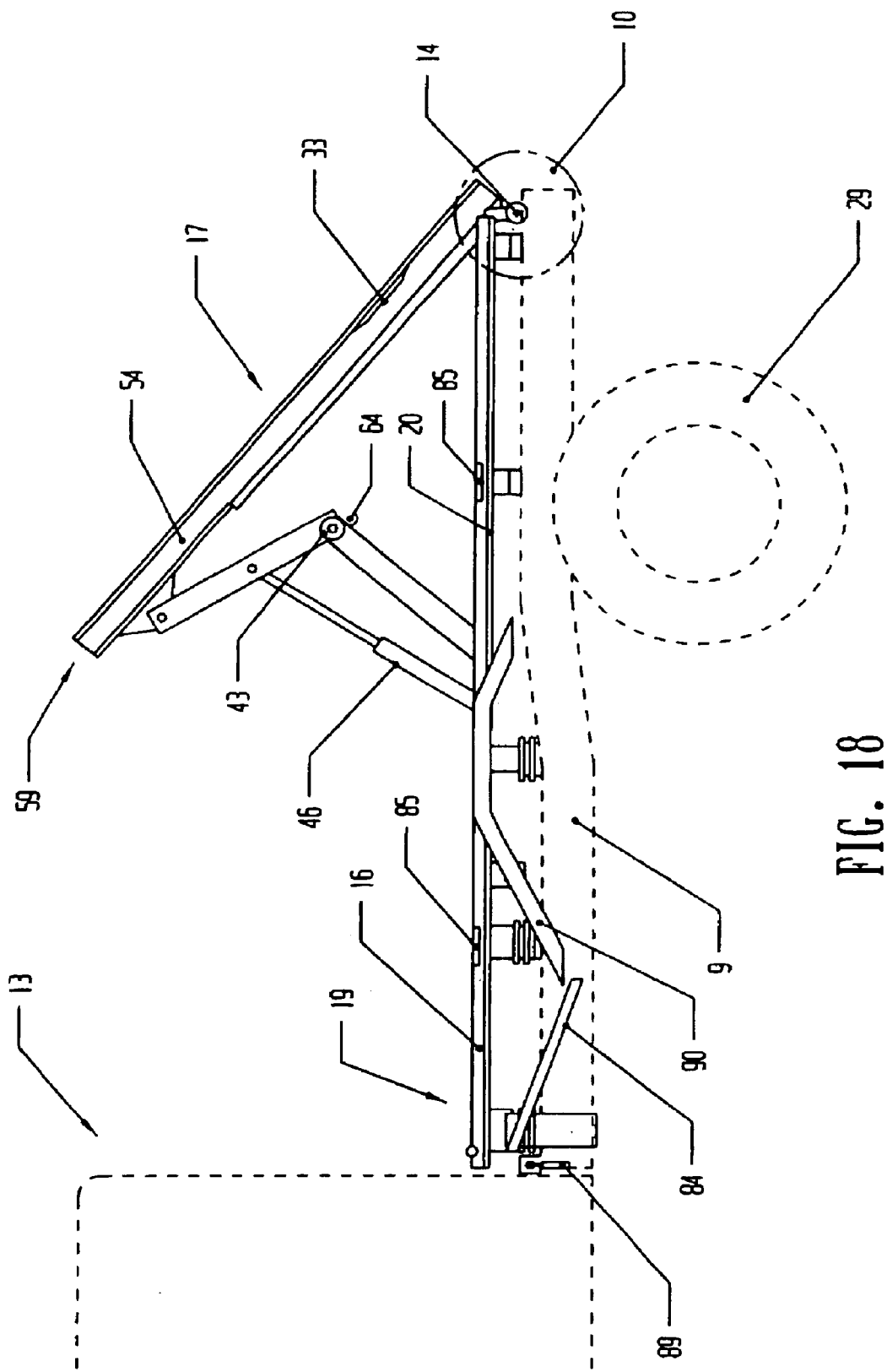
FIG. 18 is a detailed side view of the stationary frame.

Referring to FIGS. 6, 17 and 18 with the front portion 25 of the movable frame 11 moving up, the front of fender walls 98 clear the top of the tires 29 and the roller posts roll along the horizontal section of the ramps 90. The roller posts 91 roll rearward and down the rear portion of the ramps 90. With the roller posts 91 rolling to the end of the ramps 90 the shorter slide posts 69 contacts the ramps 90 and as the movable frame 11 is moved rearward the slide posts 69 slides rearward and down the ramps 90. The front-end portion 25 of the movable frame 11 continues moving rearward and down, the lower fender slide frames 95 contacts the top of the tires 29. The weight of the front end portion 25 of the movable frame 11 is removed from the slide posts 69 and ramps 90 to the lower fender slide frames 95 and the top of the rear tires 29. The frame sliding rearward with the weight of the front portion end 25 of the movable frame 11 on rear tires 29 and the weight of the rear end portion 27 of movable frame 11 on the rear block assembly slides 8 and with the receiver 72 sliding on the elevatable support rail 44, the point of balance of the movable frame slides over the rear block assembly slides 8 and the front end portion 25 of the movable frame 11 tilts upward and rearward. With the receiver interlocked with the elevatable support rail 44 the tilting action lifts the elevatable slide support. The speed of lift action is controlled by the scissor arms 15 and 37, the hydraulic cylinder 46 and its associated hydraulic flow controls and valves. The movable frame 11 tilting action occurs at the time the point of balance of the movable frame 11 slides over the rear block assembly slides 8. The tilting action timing varies depending on the distribution of the payload weight of the movable frame 11.

What is claimed is:

1. A loading apparatus comprising:
   a) a stationary frame having a drive;
   b) a movable frame having a flexible connector releasably connectable to the drive to load the movable frame onto the stationary frame; and
   c) a locking system mounted on the stationary frame to hold the flexible connector in releasable engagement with the drive, the locking system having a movable shoe arm positionable to keep the flexible connector in engagement with a first portion of the drive, the shoe arm being movable by the loading of the movable frame, when driven by the drive, to displace the moveable shoe arm so that the flexible connector may be released from the drive.

2. The loading apparatus of claim 1, wherein;
   the locking system further comprises a sensing plate locking arm adapted to contact the movable shoe arm to lock the movable shoe arm into position to keep the flexible connector in engagement with the drive; and
   the sensing plate locking arm is movable by the movement of the movable frame, when driven by the drive, to displace the sensing plate locking arm to release the movable shoe arm so that the movable shoe arm may be displaced by the movable frame to release the flexible connector from the drive.

3. The loading apparatus of claim 2 wherein the sensing plate locking arm is operably connected to a tab shaped to prevent the flexible connector from engaging a second portion of the drive, in cooperation with the movable shoe arm being positioned to keep the flexible connector in engagement with the first portion of the drive.

4. The loading apparatus of any one of claims 1 through 3, wherein the flexible connector is a chain and the drive comprises a sprocket that engages the chain.

5. The loading apparatus of any one of claims 1 through 3, wherein the stationary frame is mounted on a vehicle.

6. The loading apparatus of any one of 1 through 3, wherein:
   the flexible connector is a chain;
   the drive comprises a sprocket that engages the chain; and
   the stationary frame is mounted on a vehicle.

7. The loading apparatus of any one of claims 1 through 3, further comprising:
   a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame; and b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame.

8. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein the flexible connector is a chain and the drive comprises a sprocket that engages the chain.

9. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein movement of the movable frame, powered by the drive adapts the angle of the elevatable support so that the elevatable support slidingly engages the movable frame.

10. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein:
the flexible connector is a chain and the drive comprises a sprocket that engages the chain; and
movement of the movable frame powered by the drive adapts the angle of the elevatable support so that the elevatable support slidingly engages the movable frame.

11. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein:
movement of the movable frame powered by the drive adapts the angle of the elevatable support so that the elevatable support slidingly engages the movable frame; and
there is an interconnection between the elevatable support and the moveable frame, during sliding movement of the movable frame, so that the movable frame adapts the angle of the elevatable support through the interconnection.

12. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein:

the flexible connector is a chain and the drive comprises a sprocket that engages the chain; and movement of the movable frame powered by the drive adapts the angle of the elevatable support so that the elevatable support slidingly engages the movable frame; and there is an interconnection between the elevatable support and the moveable frame, during sliding movement of the movable frame, so that the movable frame adapts the angle of the elevatable support through the interconnection.

13. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein the lift action control mechanism is powered to control the movement of first end portion of the elevatable support towards a raised position and to control movement of the first end portion of the elevatable support towards a lowered position.

14. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein:

the flexible connector is a chain and the drive comprises a sprocket that engages the chain; and the lift action control mechanism is powered to control the movement of first end portion of the elevatable support towards a raised position and to control movement of the first end portion of the elevatable support towards a lowered position.

15. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein:

movement of the movable frame powered by the drive adapts the angle of the elevatable support so that the elevatable support slidingly engages the movable frame; and the lift action control mechanism is powered to control the movement of first end portion of the elevatable support towards a raised position and to control movement of the first end portion of the elevatable support towards a lowered position.

16. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein:

the flexible connector is a chain and the drive comprises a sprocket that engages the chain;

movement of the movable frame powered by the drive adapts the angle of the elevatable support so that the elevatable support slidingly engages the movable frame; and the lift action control mechanism is powered to control the movement of first end portion of the elevatable support towards a raised position and to control movement of the first end portion of the elevatable support towards a lowered position.

17. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein:

movement of the movable frame powered by the drive adapts the angle of the elevatable support so that the elevatable support slidingly engages the movable frame;

there is an interconnection between the elevatable support and the moveable frame, during sliding movement of the movable frame, so that the movable frame adapts the angle of the elevatable support through the interconnection; and the lift action control mechanism is powered to control the movement of first end portion of the elevatable support towards a raised position and to control movement of the first end portion of the elevatable support towards a lowered position.

18. The loading apparatus of any one of claims 1 through 3, further comprising:

a) an elevatable support mounted on the stationary frame, the elevatable support having a first end portion and a second end portion, the second end portion of the elevatable support being mounted to the stationary frame for pivotal movement with respect to the stationary frame about an elevatable support axis to provide an adjustable angle of the elevatable support wherein the drive cooperates with the stationary frame and is adapted for connection with the movable frame, so that the drive may slidably load the movable frame onto and off of the elevatable support and the stationary frame;

b) a lift action control mechanism mounted on the stationary frame cooperating with the elevatable support to modulate movement of the elevatable support about the elevatable support axis and to permit adjustment of the adjustable angle of the elevatable support so that the elevatable support slidingly engages the movable frame; and c) wherein:

the flexible connector is a chain and the drive comprises a sprocket that engages the chain; and movement of the movable frame powered by the drive adapts the angle of the elevatable support so that the elevatable support slidingly engages the movable frame;

there is an interconnection between the elevatable support and the moveable frame, during sliding movement of the movable frame, so that the movable frame adapts the angle of the elevatable support through the interconnection; and the lift action control mechanism is powered to control the movement of first end portion of the elevatable support towards a raised position and to control movement of the first end portion of the elevatable support towards a lowered position.

* * * * *